United States Patent
Kasabwala et al.

(10) Patent No.: US 11,362,811 B2
(45) Date of Patent: *Jun. 14, 2022

(54) SECURE TELECOMMUNICATIONS

(71) Applicant: Amazon Technologies, Inc., Seattle, WA (US)

(72) Inventors: Dipakkumar R. Kasabwala, Edison, NJ (US); Thomas Michael Leavy, River Edge, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/819,781

(22) Filed: Mar. 16, 2020

(65) Prior Publication Data
US 2020/0228973 A1    Jul. 16, 2020

Related U.S. Application Data

(63) Continuation of application No. 16/142,453, filed on Sep. 26, 2018, now Pat. No. 10,630,663, which is a (Continued)

(51) Int. Cl.
*H04L 9/06* (2006.01)
*H04L 29/06* (2006.01)
(Continued)

(52) U.S. Cl.
CPC .......... *H04L 9/0643* (2013.01); *H04L 9/0822* (2013.01); *H04L 9/0833* (2013.01);
(Continued)

(58) Field of Classification Search
CPC ... H04L 9/0643; H04L 63/18; H04L 65/1069; H04L 9/3066; H04L 9/0833;
(Continued)

(56) References Cited

U.S. PATENT DOCUMENTS

| 5,150,408 A | 9/1992 | Bright |
| 5,850,443 A | 12/1998 | Van Oorschot et al. |

(Continued)

FOREIGN PATENT DOCUMENTS

| EP | 2018015 A1 | 1/2009 |
| WO | 2011101784 A1 | 8/2011 |
| WO | 2014140736 A1 | 9/2014 |

OTHER PUBLICATIONS

Sep. 2015, Apple. iOS Security: iOS 9.0 or later.
(Continued)

*Primary Examiner* — Darren B Schwartz
(74) *Attorney, Agent, or Firm* — Davis Wright Tremaine LLP

(57) ABSTRACT

The present disclosure describes techniques for configuring and participating in encrypted audio calls, audio conferences, video calls, and video conferences. In particular, a call initiator generates a meeting identifier and a first meeting key, which are encrypted using a first encryption key and distributed to one or more participants of the call. The one or more participants decrypt the meeting identifier and the first meeting key, and use that information to participate in the encrypted call. Further, participants respond to the encrypted communication data by encrypting their reply data with the first meeting key. The call initiator decrypts the reply data using the first meeting key.

17 Claims, 10 Drawing Sheets

Related U.S. Application Data continuation of application No. 15/381,093, filed on Dec. 15, 2016, now Pat. No. 10,116,637, which is a continuation of application No. 15/190,139, filed on Jun. 22, 2016, now Pat. No. 9,596,079.

(60) Provisional application No. 62/322,679, filed on Apr. 14, 2016.

(51) Int. Cl.

| | | |
|---|---|---|
| *H04W 12/033* | (2021.01) | |
| *H04W 12/041* | (2021.01) | |
| *H04W 12/69* | (2021.01) | |
| *H04L 9/30* | (2006.01) | |
| *H04L 9/08* | (2006.01) | |
| *H04N 7/14* | (2006.01) | |
| *H04N 7/15* | (2006.01) | |
| *H04L 9/40* | (2022.01) | |
| *H04L 65/1069* | (2022.01) | |

(52) U.S. Cl.
CPC .......... *H04L 9/0861* (2013.01); *H04L 9/0891* (2013.01); *H04L 9/3066* (2013.01); *H04L 63/0428* (2013.01); *H04L 63/061* (2013.01); *H04L 63/062* (2013.01); *H04L 63/18* (2013.01); *H04L 65/1069* (2013.01); *H04N 7/147* (2013.01); *H04N 7/15* (2013.01); *H04W 12/033* (2021.01); *H04W 12/041* (2021.01); *H04W 12/69* (2021.01); *H04L 63/0876* (2013.01)

(58) Field of Classification Search
CPC . H04L 9/0891; H04L 63/0428; H04L 63/062; H04L 9/0861; H04L 9/0822; H04L 63/061; H04L 63/0876; H04W 12/033; H04W 12/041; H04W 12/69; H04N 7/147; H04N 7/15
See application file for complete search history.

(56) References Cited

U.S. PATENT DOCUMENTS

| | | | |
|---|---|---|---|
| 5,953,419 | A | 9/1999 | Lohstroh |
| 6,009,173 | A | 12/1999 | Sumner |
| 6,091,820 | A | 7/2000 | Aziz |
| 6,112,227 | A | 8/2000 | Heiner |
| 6,145,079 | A | 11/2000 | Witty |
| 6,263,435 | B1 | 7/2001 | Dondeti et al. |
| 6,266,420 | B1 | 7/2001 | Langford |
| 6,289,450 | B1 | 9/2001 | Pensak et al. |
| 6,314,190 | B1 | 11/2001 | Zimmerman |
| 6,324,569 | B1 | 11/2001 | Ogilvie et al. |
| 6,393,464 | B1 | 5/2002 | Dieterman |
| 6,405,315 | B1 | 6/2002 | Burns et al. |
| 6,457,134 | B1 | 9/2002 | Lemke |
| 6,463,155 | B1 | 10/2002 | Akiyama |
| 6,463,460 | B1 | 10/2002 | Simonoff |
| 6,463,463 | B1 | 10/2002 | Godfrey |
| 6,584,566 | B1 | 6/2003 | Hardjono |
| 6,606,706 | B1 | 8/2003 | Li |
| 6,711,608 | B1 | 3/2004 | Ogilvie |
| 6,721,784 | B1 | 4/2004 | Leonard et al. |
| 6,742,116 | B1 | 5/2004 | Matsui et al. |
| 6,785,809 | B1 | 8/2004 | Hardjono |
| 6,801,998 | B1 | 10/2004 | Hanna |
| 6,804,257 | B1 | 10/2004 | Benayoun |
| 6,851,049 | B1 | 2/2005 | Price, III |
| 6,904,521 | B1 | 6/2005 | Jivsov |
| 6,912,656 | B1 | 6/2005 | Perlman et al. |
| 6,947,556 | B1 | 9/2005 | Matyas |
| 6,975,729 | B1 | 12/2005 | Perlman |
| 6,978,284 | B2 | 12/2005 | McBrearty |
| 7,024,456 | B1 | 4/2006 | Simonoff |
| 7,043,529 | B1 | 5/2006 | Simonoff |
| 7,139,399 | B1 | 11/2006 | Zimmermann |
| 7,149,893 | B1 | 12/2006 | Leonard et al. |
| 7,171,001 | B2 | 1/2007 | Tuvell et al. |
| 7,178,021 | B1 | 2/2007 | Hanna |
| 7,197,537 | B2 | 3/2007 | Koch |
| 7,234,063 | B1 | 6/2007 | Baugher et al. |
| 7,243,231 | B2 | 7/2007 | Ellison |
| 7,263,619 | B1 | 8/2007 | Kim |
| 7,308,477 | B1 | 12/2007 | Gress et al. |
| 7,356,564 | B2 | 4/2008 | Hartselle et al. |
| 7,366,894 | B1 | 4/2008 | Kalimuthu et al. |
| 7,383,439 | B2 | 6/2008 | Price et al. |
| 7,509,491 | B1 | 3/2009 | Wainner et al. |
| 7,526,620 | B1 | 4/2009 | Mcgovern |
| 7,580,521 | B1 | 8/2009 | Spies et al. |
| 7,584,505 | B2 | 9/2009 | Mondri et al. |
| 7,640,427 | B2 | 12/2009 | Callas et al. |
| 7,657,037 | B2 | 2/2010 | Callas |
| 7,711,120 | B2 | 5/2010 | Kimmel |
| 7,715,565 | B2 | 5/2010 | Kimmel et al. |
| 7,730,309 | B2 | 6/2010 | Zimmerman |
| 7,739,501 | B2 | 6/2010 | Kimmel |
| 7,802,099 | B2 | 9/2010 | Mitchell et al. |
| 7,873,572 | B2 | 1/2011 | Reardon |
| 8,036,221 | B2 | 10/2011 | Fluhrer et al. |
| 8,127,350 | B2 | 2/2012 | Wei et al. |
| 8,156,536 | B2 | 4/2012 | Polk |
| 8,175,277 | B2 | 5/2012 | Bell et al. |
| 8,291,031 | B1 | 10/2012 | Kirkham |
| 8,295,306 | B2 | 10/2012 | Bagepalli et al. |
| 8,347,083 | B1 | 1/2013 | Scudder |
| 8,356,177 | B2 | 1/2013 | McGrew et al. |
| 8,364,764 | B2 | 1/2013 | Hartselle et al. |
| 8,364,984 | B2 | 1/2013 | Jeffries et al. |
| 8,379,857 | B1 | 2/2013 | Zheng |
| 8,380,868 | B2 | 2/2013 | Hiie |
| 8,392,699 | B2 | 3/2013 | Jones et al. |
| 8,407,471 | B1 | 3/2013 | Sobel |
| 8,412,934 | B2 | 4/2013 | De Atley et al. |
| 8,429,420 | B1 | 4/2013 | Melvin |
| 8,433,901 | B2 | 4/2013 | De Atley et al. |
| 8,447,970 | B2 | 5/2013 | Klein et al. |
| 8,478,893 | B2 | 7/2013 | Hiie |
| 8,489,889 | B1 | 7/2013 | Moscaritolo et al. |
| 8,503,621 | B2 | 8/2013 | Patel et al. |
| 8,503,681 | B1 | 8/2013 | McGrew et al. |
| 8,510,552 | B2 | 8/2013 | De Atley et al. |
| 8,526,616 | B2 | 9/2013 | Feudo et al. |
| 8,527,769 | B2 | 9/2013 | Kotla et al. |
| 8,549,643 | B1 | 10/2013 | Shou |
| 8,560,843 | B1 | 10/2013 | Moscaritolo et al. |
| 8,566,350 | B2 | 10/2013 | Chow |
| 8,572,757 | B1 | 10/2013 | Stamos |
| 8,588,425 | B1 | 11/2013 | Harwood |
| 8,589,673 | B2 | 11/2013 | Ackerly |
| 8,589,680 | B2 | 11/2013 | De Atley et al. |
| 8,601,114 | B1 | 12/2013 | Cooper |
| 8,601,263 | B1 | 12/2013 | Shankar et al. |
| 8,631,227 | B2 | 1/2014 | Olechowski et al. |
| 8,667,271 | B2 | 3/2014 | Shkolnikov |
| 8,677,136 | B2 | 3/2014 | Brokenshire et al. |
| 8,682,893 | B2 | 3/2014 | Summerlin |
| 8,689,015 | B2 | 4/2014 | Jeffries et al. |
| 8,705,565 | B2 | 4/2014 | Kutt et al. |
| 8,713,311 | B1 | 4/2014 | Roskind |
| 8,719,233 | B2 | 5/2014 | Gandhi |
| 8,726,009 | B1 | 5/2014 | Cook et al. |
| 8,726,369 | B1 | 5/2014 | Emigh |
| 8,732,452 | B2 | 5/2014 | Byrum et al. |
| 8,750,507 | B2 | 6/2014 | Roosta et al. |
| 8,756,419 | B2 | 6/2014 | De Atley et al. |
| 8,762,712 | B1 | 6/2014 | Kwan |
| 8,782,409 | B2 | 7/2014 | Murphy et al. |
| 8,788,842 | B2 | 7/2014 | Brouwer et al. |
| 8,788,899 | B2 | 7/2014 | Hiie |
| 8,798,614 | B2 | 8/2014 | Bellovin |
| 8,824,664 | B1 | 9/2014 | Ristock et al. |

(56) References Cited

U.S. PATENT DOCUMENTS

| | | |
|---|---|---|
| 8,837,739 B1 | 9/2014 | Sexton et al. |
| 8,862,129 B2 | 10/2014 | Moshir et al. |
| 8,863,226 B1 | 10/2014 | Bailey, Jr |
| 8,874,902 B2 | 10/2014 | Ackerly |
| 8,913,994 B2 | 12/2014 | Edwards et al. |
| 8,918,896 B2 | 12/2014 | Murphy et al. |
| 8,925,109 B2 | 12/2014 | Agrawal |
| 8,938,810 B2 | 1/2015 | Richardson et al. |
| 8,948,382 B2 | 2/2015 | Hassan et al. |
| 8,948,391 B2 | 2/2015 | Kritt et al. |
| 8,954,740 B1 | 2/2015 | Moscaritolo et al. |
| 8,958,559 B2 | 2/2015 | Medina et al. |
| 8,996,861 B1 | 3/2015 | Cummings et al. |
| 9,027,114 B2 | 5/2015 | Akhter et al. |
| 9,037,796 B2 | 5/2015 | Pal |
| 9,059,840 B2 | 6/2015 | Connelly et al. |
| 9,071,597 B2 | 6/2015 | Lord et al. |
| 9,075,638 B2 | 7/2015 | Barnett et al. |
| 9,077,525 B2 | 7/2015 | Chandran et al. |
| 9,078,127 B2 | 7/2015 | Kritt et al. |
| 9,094,405 B2 | 7/2015 | Buck et al. |
| 9,100,373 B2 | 8/2015 | Deluca et al. |
| 9,124,559 B2 | 9/2015 | Deluca et al. |
| 9,130,822 B2 | 9/2015 | Cooper |
| 9,137,191 B2 | 9/2015 | Firstenberg et al. |
| 9,154,612 B2 | 10/2015 | Moshir et al. |
| 9,197,616 B2 | 11/2015 | Sinha |
| 9,210,143 B2 | 12/2015 | Ozzie |
| 9,224,014 B2 | 12/2015 | Rios |
| 9,225,709 B2 | 12/2015 | Ackerly |
| 9,237,016 B2 | 1/2016 | De Atley et al. |
| 9,264,406 B2 | 2/2016 | Kipnis et al. |
| 9,282,192 B2 | 3/2016 | Laasik et al. |
| 9,288,047 B2 | 3/2016 | Brouwer et al. |
| 9,326,135 B2 | 4/2016 | Rodrigues et al. |
| 9,380,044 B2 | 6/2016 | Zhang et al. |
| 9,413,882 B2 | 8/2016 | Gisby et al. |
| 9,674,163 B1 | 6/2017 | Feudo et al. |
| 10,176,310 B2* | 1/2019 | Baghdasaryan ...... H04L 9/0841 |
| 10,305,686 B2 | 5/2019 | Albrecht et al. |
| 10,769,628 B2* | 9/2020 | Sullivan ............. G06Q 20/3825 |
| 2001/0044901 A1 | 11/2001 | Grawrock |
| 2002/0002468 A1 | 1/2002 | Spagna |
| 2002/0007452 A1* | 1/2002 | Traw ................... G11B 20/0021 |
| | | 713/152 |
| 2002/0026487 A1 | 2/2002 | Ogilvie et al. |
| 2002/0037736 A1 | 3/2002 | Kawaguchi et al. |
| 2002/0038296 A1 | 3/2002 | Margolus et al. |
| 2002/0038421 A1 | 3/2002 | Hamada |
| 2002/0062440 A1 | 5/2002 | Akama |
| 2002/0078380 A1 | 6/2002 | Lin |
| 2002/0094085 A1 | 7/2002 | Roberts |
| 2002/0095465 A1 | 7/2002 | Banks |
| 2002/0154776 A1 | 10/2002 | Sowa et al. |
| 2002/0166053 A1 | 11/2002 | Wilson |
| 2002/0186703 A1 | 12/2002 | West |
| 2003/0021416 A1 | 1/2003 | Brown et al. |
| 2003/0028597 A1 | 2/2003 | Salmi |
| 2003/0037114 A1 | 2/2003 | Nishio |
| 2003/0046533 A1 | 3/2003 | Olkin |
| 2003/0084050 A1 | 5/2003 | Hall |
| 2003/0084347 A1 | 5/2003 | Luzzatto |
| 2003/0126215 A1 | 7/2003 | Udell et al. |
| 2003/0126464 A1 | 7/2003 | McDaniel et al. |
| 2003/0131060 A1 | 7/2003 | Hartselle et al. |
| 2003/0191937 A1 | 10/2003 | Balissat |
| 2003/0204720 A1 | 10/2003 | Schoen |
| 2003/0208686 A1 | 11/2003 | Thummalapally |
| 2003/0217266 A1 | 11/2003 | Epp |
| 2003/0229668 A1 | 12/2003 | Malik |
| 2004/0013113 A1 | 1/2004 | Singh |
| 2004/0025057 A1 | 2/2004 | Cook |
| 2004/0054891 A1 | 3/2004 | Hengeveld et al. |
| 2004/0064512 A1 | 4/2004 | Arora |
| 2004/0078568 A1 | 4/2004 | Pham |
| 2004/0083297 A1 | 4/2004 | Gazzetta et al. |
| 2004/0107349 A1 | 6/2004 | Sasselli |
| 2004/0111612 A1 | 6/2004 | Choi |
| 2004/0131190 A1* | 7/2004 | Nobel ................. H04L 63/0442 |
| | | 380/282 |
| 2004/0133520 A1 | 7/2004 | Callas et al. |
| 2004/0133775 A1 | 7/2004 | Callas et al. |
| 2004/0168055 A1 | 8/2004 | Lord et al. |
| 2004/0205248 A1 | 10/2004 | Little |
| 2004/0210772 A1 | 10/2004 | Hooker et al. |
| 2004/0215735 A1 | 10/2004 | Nakahara et al. |
| 2005/0005106 A1 | 1/2005 | Chen |
| 2005/0044059 A1 | 2/2005 | Samar |
| 2005/0053232 A1 | 3/2005 | Bace |
| 2005/0076061 A1 | 4/2005 | Cox |
| 2005/0086527 A1 | 4/2005 | Jackson |
| 2005/0097317 A1 | 5/2005 | Trostle et al. |
| 2005/0102528 A1 | 5/2005 | Tan |
| 2005/0125659 A1 | 6/2005 | Sarfati |
| 2005/0149732 A1 | 7/2005 | Freeman |
| 2005/0160292 A1 | 7/2005 | Batthish |
| 2005/0187966 A1 | 8/2005 | Iino |
| 2005/0193199 A1 | 9/2005 | Asokan |
| 2005/0198170 A1 | 9/2005 | LeMay et al. |
| 2005/0204161 A1 | 9/2005 | Caronni |
| 2005/0229257 A1 | 10/2005 | Kim |
| 2005/0246553 A1 | 11/2005 | Nakamura et al. |
| 2005/0262338 A1 | 11/2005 | Irwin |
| 2005/0273592 A1 | 12/2005 | Pryor |
| 2006/0020796 A1 | 1/2006 | Aura |
| 2006/0029226 A1 | 2/2006 | Han et al. |
| 2006/0031670 A1 | 2/2006 | Price et al. |
| 2006/0036739 A1 | 2/2006 | Hagale et al. |
| 2006/0075234 A1 | 4/2006 | You |
| 2006/0090073 A1 | 4/2006 | Steinberg |
| 2006/0093138 A1* | 5/2006 | Durand ................. H04L 9/0844 |
| | | 380/44 |
| 2006/0133346 A1 | 6/2006 | Cheeda et al. |
| 2006/0147000 A1 | 7/2006 | Novi |
| 2006/0149822 A1 | 7/2006 | Henry et al. |
| 2006/0168446 A1 | 7/2006 | Ahonen et al. |
| 2006/0193473 A1 | 8/2006 | Fu |
| 2006/0212928 A1 | 9/2006 | Maino |
| 2006/0288209 A1 | 12/2006 | Vogler |
| 2006/0291662 A1 | 12/2006 | Takahashi et al. |
| 2007/0003065 A1 | 1/2007 | Schwartz et al. |
| 2007/0003066 A1 | 1/2007 | Schwartz et al. |
| 2007/0005713 A1 | 1/2007 | LeVasseur |
| 2007/0011469 A1 | 1/2007 | Allison |
| 2007/0016663 A1 | 1/2007 | Weis |
| 2007/0016771 A1 | 1/2007 | Allison |
| 2007/0022469 A1 | 1/2007 | Cooper et al. |
| 2007/0050624 A1 | 3/2007 | Lord et al. |
| 2007/0053520 A1* | 3/2007 | Eckleder ............... H04L 9/0833 |
| | | 380/278 |
| 2007/0073823 A1 | 3/2007 | Cohen et al. |
| 2007/0116269 A1 | 5/2007 | Nochta |
| 2007/0140480 A1 | 6/2007 | Yao |
| 2007/0143600 A1 | 6/2007 | Kellil et al. |
| 2007/0150521 A1 | 6/2007 | Vedula |
| 2007/0192464 A1 | 8/2007 | Tullberg |
| 2007/0198836 A1 | 8/2007 | Fedyk et al. |
| 2007/0199071 A1 | 8/2007 | Callas |
| 2007/0233832 A1 | 10/2007 | Narayanan |
| 2007/0274525 A1 | 11/2007 | Takata et al. |
| 2007/0276836 A1 | 11/2007 | Chatterjee et al. |
| 2007/0277240 A1 | 11/2007 | Durfee |
| 2008/0019528 A1 | 1/2008 | Kneissler |
| 2008/0019530 A1 | 1/2008 | Eldridge et al. |
| 2008/0022061 A1 | 1/2008 | Ito et al. |
| 2008/0049941 A1 | 2/2008 | Kim et al. |
| 2008/0065878 A1 | 3/2008 | Hutson |
| 2008/0077686 A1 | 3/2008 | Subhraveti |
| 2008/0091780 A1 | 4/2008 | Balan et al. |
| 2008/0095371 A1 | 4/2008 | Vataja |
| 2008/0098038 A1 | 4/2008 | Motoyama et al. |
| 2008/0162647 A1 | 7/2008 | Liang |
| 2008/0162929 A1 | 7/2008 | Ishikawa et al. |
| 2008/0165952 A1 | 7/2008 | Smith et al. |

(56) References Cited

U.S. PATENT DOCUMENTS

| | | |
|---|---|---|
| 2008/0235336 A1 | 9/2008 | Stern |
| 2008/0235507 A1 | 9/2008 | Ishikawa et al. |
| 2008/0281930 A1 | 11/2008 | Hartselle et al. |
| 2009/0052660 A1 | 2/2009 | Chen et al. |
| 2009/0069033 A1 | 3/2009 | Karstens et al. |
| 2009/0070466 A1 | 3/2009 | Elbring |
| 2009/0070586 A1 | 3/2009 | Bucker et al. |
| 2009/0083112 A1 | 3/2009 | Bhogal |
| 2009/0097662 A1 | 4/2009 | Olechowski |
| 2009/0100268 A1 | 4/2009 | Garcia et al. |
| 2009/0132822 A1 | 5/2009 | Chen |
| 2009/0154705 A1 | 6/2009 | Price et al. |
| 2009/0190764 A1 | 7/2009 | Liu |
| 2009/0198997 A1 | 8/2009 | Yeap |
| 2009/0222668 A1 | 9/2009 | Zaccone |
| 2009/0235343 A1 | 9/2009 | Sheehan |
| 2009/0265552 A1 | 10/2009 | Moshir et al. |
| 2009/0271612 A1 | 10/2009 | Liu |
| 2009/0281829 A1 | 11/2009 | Hansen et al. |
| 2009/0299200 A1 | 12/2009 | Eggenberger |
| 2010/0002882 A1 | 1/2010 | Rieger et al. |
| 2010/0017607 A1 | 1/2010 | Shkolnikov et al. |
| 2010/0031038 A1 | 2/2010 | Kruegel et al. |
| 2010/0074446 A1 | 3/2010 | Fuchs et al. |
| 2010/0100967 A1 | 4/2010 | Douglas et al. |
| 2010/0138619 A1 | 6/2010 | Benavides |
| 2010/0138934 A1 | 6/2010 | Minoshima |
| 2010/0153728 A1* | 6/2010 | Brown ............... H04L 9/3066 713/171 |
| 2010/0161817 A1 | 6/2010 | Xiao |
| 2010/0174911 A1 | 7/2010 | Isshiki |
| 2010/0199340 A1 | 8/2010 | Jonas et al. |
| 2010/0211541 A1 | 8/2010 | Deetz et al. |
| 2010/0217984 A1 | 8/2010 | Hill |
| 2010/0223470 A1 | 9/2010 | Lord et al. |
| 2010/0239077 A1 | 9/2010 | Michaelis et al. |
| 2010/0239087 A1 | 9/2010 | Chaisson |
| 2010/0250939 A1 | 9/2010 | Adams |
| 2010/0250946 A1 | 9/2010 | Korte |
| 2010/0262714 A1 | 10/2010 | Hiie |
| 2010/0275007 A1 | 10/2010 | Kutt et al. |
| 2010/0296655 A1 | 11/2010 | Solow et al. |
| 2010/0304766 A1 | 12/2010 | Goyal |
| 2011/0010704 A1 | 1/2011 | Jeon |
| 2011/0035591 A1 | 2/2011 | Dudziak et al. |
| 2011/0072262 A1 | 3/2011 | Amir |
| 2011/0131406 A1 | 6/2011 | Jones et al. |
| 2011/0135097 A1 | 6/2011 | Redfern et al. |
| 2011/0145564 A1 | 6/2011 | Moshir et al. |
| 2011/0145571 A1 | 6/2011 | Schmidt-Karaca et al. |
| 2011/0151903 A1 | 6/2011 | Moshir et al. |
| 2011/0182426 A1 | 7/2011 | Roosta et al. |
| 2011/0202598 A1 | 8/2011 | Evans et al. |
| 2011/0246942 A1 | 10/2011 | Misawa |
| 2011/0307707 A1 | 12/2011 | Fielder |
| 2012/0030183 A1 | 2/2012 | Deetz et al. |
| 2012/0030743 A1 | 2/2012 | Semba |
| 2012/0045064 A1 | 2/2012 | Rembarz et al. |
| 2012/0082312 A1* | 4/2012 | Liu ............... H04L 9/0844 380/262 |
| 2012/0087493 A1 | 4/2012 | Chidambaram et al. |
| 2012/0096035 A1 | 4/2012 | Spector |
| 2012/0098639 A1 | 4/2012 | Ijas |
| 2012/0102326 A1 | 4/2012 | Palekar |
| 2012/0117568 A1 | 5/2012 | Plotkin |
| 2012/0151554 A1* | 6/2012 | Tie ............... H04L 63/205 726/1 |
| 2012/0159164 A1 | 6/2012 | Brown et al. |
| 2012/0170743 A1 | 7/2012 | Senese et al. |
| 2012/0173353 A1 | 7/2012 | Rausch |
| 2012/0173880 A1 | 7/2012 | Swaminathan |
| 2012/0179905 A1 | 7/2012 | Ackerly |
| 2012/0184309 A1 | 7/2012 | Cohen |
| 2012/0209924 A1 | 8/2012 | Evans et al. |
| 2012/0231770 A1 | 9/2012 | Clarke |
| 2012/0240037 A1 | 9/2012 | Migos et al. |
| 2012/0243683 A1 | 9/2012 | Oba et al. |
| 2012/0257756 A1 | 10/2012 | Huang et al. |
| 2012/0284518 A1* | 11/2012 | Walker ............... H04L 9/3255 713/171 |
| 2012/0297451 A1 | 11/2012 | Ozzie |
| 2012/0300331 A1 | 11/2012 | Deetz |
| 2012/0311329 A1 | 12/2012 | Medina et al. |
| 2012/0331073 A1 | 12/2012 | Williams |
| 2013/0034229 A1 | 2/2013 | Sauerwald et al. |
| 2013/0036302 A1 | 2/2013 | Lord et al. |
| 2013/0046828 A1 | 2/2013 | Grewal et al. |
| 2013/0070045 A1 | 3/2013 | Meek |
| 2013/0070925 A1 | 3/2013 | Yamada et al. |
| 2013/0073850 A1 | 3/2013 | Zaverucha |
| 2013/0077774 A1 | 3/2013 | Lynch, III |
| 2013/0080782 A1 | 3/2013 | Rajadurai et al. |
| 2013/0091298 A1 | 4/2013 | Ozzie et al. |
| 2013/0097688 A1 | 4/2013 | Bradley, II et al. |
| 2013/0136255 A1 | 5/2013 | Brown |
| 2013/0138968 A1 | 5/2013 | Yudkin |
| 2013/0159436 A1 | 6/2013 | Hartselle et al. |
| 2013/0173905 A1 | 7/2013 | Inatomi et al. |
| 2013/0194301 A1 | 8/2013 | Robbins et al. |
| 2013/0198522 A1 | 8/2013 | Kohno |
| 2013/0208725 A1 | 8/2013 | Wakumoto |
| 2013/0219035 A1 | 8/2013 | Detienne |
| 2013/0232209 A1 | 9/2013 | Fernandez et al. |
| 2013/0252585 A1 | 9/2013 | Moshir et al. |
| 2013/0254537 A1 | 9/2013 | Bogorad |
| 2013/0275842 A1 | 10/2013 | Peach |
| 2013/0290416 A1 | 10/2013 | Nelson |
| 2013/0304833 A1 | 11/2013 | St. Clair |
| 2013/0305049 A1 | 11/2013 | Krakowski |
| 2013/0305057 A1 | 11/2013 | Greco et al. |
| 2013/0308628 A1 | 11/2013 | Marueli et al. |
| 2013/0326220 A1 | 12/2013 | Connelly |
| 2013/0332724 A1 | 12/2013 | Walters |
| 2013/0339465 A1 | 12/2013 | Zhang |
| 2014/0033286 A1 | 1/2014 | Zhang |
| 2014/0052982 A1 | 2/2014 | Ackerly |
| 2014/0053150 A1 | 2/2014 | Barnett et al. |
| 2014/0068254 A1 | 3/2014 | Scharf |
| 2014/0090042 A1 | 3/2014 | Short, III |
| 2014/0101444 A1 | 4/2014 | Lee et al. |
| 2014/0129785 A1 | 5/2014 | Deetz et al. |
| 2014/0129838 A1 | 5/2014 | Kim |
| 2014/0136842 A1 | 5/2014 | Kitze et al. |
| 2014/0157435 A1 | 6/2014 | Stamos |
| 2014/0162601 A1 | 6/2014 | Kim |
| 2014/0164776 A1 | 6/2014 | Hook et al. |
| 2014/0169554 A1 | 6/2014 | Scarisbrick |
| 2014/0181221 A1 | 6/2014 | Kushtagi |
| 2014/0181514 A1 | 6/2014 | Aoyagi et al. |
| 2014/0196140 A1 | 7/2014 | Gong |
| 2014/0206285 A1 | 7/2014 | Jance et al. |
| 2014/0207887 A1 | 7/2014 | Hartselle et al. |
| 2014/0207900 A1 | 7/2014 | Liu |
| 2014/0211938 A1* | 7/2014 | Campagna ............ H04L 9/3252 380/44 |
| 2014/0233736 A1 | 8/2014 | Zhang et al. |
| 2014/0244996 A1 | 8/2014 | Parthasarathy et al. |
| 2014/0258719 A1 | 9/2014 | Cidon |
| 2014/0304508 A1 | 10/2014 | Murphy et al. |
| 2014/0304515 A1 | 10/2014 | Feuerman |
| 2014/0307543 A1 | 10/2014 | Marueli et al. |
| 2014/0325622 A1 | 10/2014 | Luk |
| 2014/0325667 A1 | 10/2014 | Sun |
| 2014/0351586 A1 | 11/2014 | Hook et al. |
| 2014/0373173 A1 | 12/2014 | Baker, II |
| 2015/0003615 A1 | 1/2015 | Vanstone et al. |
| 2015/0006884 A1 | 1/2015 | Ackerly |
| 2015/0039882 A1 | 2/2015 | Watanabe |
| 2015/0082391 A1 | 3/2015 | Lerman et al. |
| 2015/0106628 A1 | 4/2015 | Holman |
| 2015/0121549 A1 | 4/2015 | Baessler et al. |
| 2015/0143546 A1 | 5/2015 | Bradley, II et al. |
| 2015/0154206 A1 | 6/2015 | Sanjeev et al. |
| 2015/0156177 A1 | 6/2015 | Murphy et al. |

(56) References Cited

U.S. PATENT DOCUMENTS

| | | | |
|---|---|---|---|
| 2015/0169615 A1 | 6/2015 | Batchu | |
| 2015/0169893 A1 | 6/2015 | Desai | |
| 2015/0195239 A1 | 7/2015 | Firstenberg et al. | |
| 2015/0195261 A1 | 7/2015 | Gehrmann et al. | |
| 2015/0200774 A1* | 7/2015 | Le Saint | H04W 12/041 |
| | | | 713/171 |
| 2015/0215291 A1 | 7/2015 | Abdunabi et al. | |
| 2015/0227761 A1 | 8/2015 | Cohen | |
| 2015/0229612 A1 | 8/2015 | Hassan et al. | |
| 2015/0244658 A1 | 8/2015 | Speyer et al. | |
| 2015/0244684 A1 | 8/2015 | Ng | |
| 2015/0244720 A1 | 8/2015 | Suh | |
| 2015/0264005 A1 | 9/2015 | Brooks | |
| 2015/0264042 A1 | 9/2015 | Lord et al. | |
| 2015/0264540 A1 | 9/2015 | Brooks et al. | |
| 2015/0271653 A1 | 9/2015 | Brooks et al. | |
| 2015/0281185 A1 | 10/2015 | Cooley | |
| 2015/0282117 A1 | 10/2015 | Pozuelo | |
| 2015/0295936 A1 | 10/2015 | Wang | |
| 2015/0304849 A1 | 10/2015 | Moom | |
| 2015/0312260 A1 | 10/2015 | Kim | |
| 2015/0319149 A1 | 11/2015 | Alshammari | |
| 2015/0326731 A1 | 11/2015 | Laasik et al. | |
| 2015/0332332 A1 | 11/2015 | Darmaki et al. | |
| 2015/0347770 A1 | 12/2015 | Whalley | |
| 2015/0350036 A1 | 12/2015 | Cooper et al. | |
| 2015/0350119 A1 | 12/2015 | Thirumalai et al. | |
| 2015/0350247 A1 | 12/2015 | Adler et al. | |
| 2015/0350895 A1 | 12/2015 | Brander et al. | |
| 2015/0365395 A1 | 12/2015 | Enriquez et al. | |
| 2015/0370918 A1 | 12/2015 | Patterson et al. | |
| 2015/0372811 A1* | 12/2015 | Le Saint | G06Q 20/3227 |
| | | | 705/76 |
| 2015/0373021 A1 | 12/2015 | Tussy et al. | |
| 2016/0013939 A1 | 1/2016 | Jun | |
| 2016/0034692 A1 | 2/2016 | Singler et al. | |
| 2016/0036791 A1 | 2/2016 | Sauerwald et al. | |
| 2016/0055325 A1 | 2/2016 | Ozzie | |
| 2016/0057156 A1 | 2/2016 | Lin et al. | |
| 2016/0063258 A1 | 3/2016 | Ackerly | |
| 2016/0065362 A1 | 3/2016 | Choyi et al. | |
| 2016/0065370 A1* | 3/2016 | Le Saint | H04L 63/061 |
| | | | 713/155 |
| 2016/0065530 A1 | 3/2016 | Prado et al. | |
| 2016/0072781 A1 | 3/2016 | Zhang et al. | |
| 2016/0080149 A1 | 3/2016 | Mehta et al. | |
| 2016/0105859 A1 | 4/2016 | Zhu | |
| 2016/0127331 A1* | 5/2016 | Liu | H04L 9/0822 |
| | | | 713/171 |
| 2016/0149901 A1 | 5/2016 | Liu et al. | |
| 2016/0191513 A1 | 6/2016 | Tomlinson | |
| 2016/0197901 A1 | 7/2016 | Lester et al. | |
| 2016/0265005 A1 | 9/2016 | Zelle et al. | |
| 2017/0055148 A1* | 2/2017 | Zimmerman | H04L 9/0825 |
| 2017/0085557 A1* | 3/2017 | Hu | H04L 63/0823 |
| 2017/0093565 A1 | 3/2017 | Yang et al. | |
| 2017/0126409 A1 | 5/2017 | Freudiger | |
| 2017/0142082 A1* | 5/2017 | Qian | H04L 63/0442 |
| 2017/0149748 A1 | 5/2017 | Lindteigen et al. | |
| 2017/0171174 A1* | 6/2017 | Campagna | H04L 63/0876 |
| 2017/0180122 A1 | 6/2017 | Smith et al. | |
| 2017/0318616 A1 | 11/2017 | Yu | |
| 2017/0338964 A1* | 11/2017 | O'Regan | H04L 9/14 |
| 2017/0339557 A1 | 11/2017 | Gopalan et al. | |
| 2018/0062851 A1* | 3/2018 | Cronholm | H04L 9/3247 |
| 2018/0227279 A1* | 8/2018 | Kim | H04W 4/80 |
| 2018/0376318 A1* | 12/2018 | Wang | H04W 4/70 |
| 2019/0089532 A1* | 3/2019 | Lambert | H04L 63/08 |

OTHER PUBLICATIONS

Mar. 9, 2015, Author Unknown, "Threema Cryptography Whitepaper".

Mar. 2004, M. Baugher et al., RFC 3711: The Secure Real-time Transport Protocol (SRTP).

Nov. 26, 2013, Marlinspike, Moxie, "Advanced Cryptographic Ratcheting".

Dec. 5, 2012, Moscaritolo et al. "Silent Circle Instant Messaging Protocol Protocol Specification" Silent Circle Engineering.

Apr. 4, 2016, WhatsApp Encryption Overview Technical White Paper.

Author Unknown, "myENIGMA: Whitepaper", Qnective AG 2013.

Author Unknown, "Perfect Forward Secrecy", IBM Security SiteProtector System, http://pic.dhe.ibm.com/infocenter/sprotect/v2r8m0/index.jsp?topic- =%2Fcom.ibm.siteprotector.doc%2Freferences%2Fsp.sub.-agenthelp.sub.--perf-ect.sub.-forward.sub.-secrey.htm, (n.d.).

Author Unknown, "Threema Cyrptography Whitepaper" Threema., Mar. 9, 2015.

B. Kaliski, "PKCS #7: Cryptographic Message Syntax", Version 1.5, Mar. 1998, http://tools.ietf.org/html/rfc2315.

Callas et al., "OpenPGP Message Format", RFC 4880, Nov. 2007.

Cremers et al., "One-round strongly secure key exchange with perfect forward secrecy and deniability", IACR Cryptology ePrint Archive, Version 3, 2011.

Diffie et al., "Authentication and authenticated key exchanges", Designs, Codes and Cryptography, vol. 2, Issue 2, pp. 107-125, Jun. 1992.

Lin et al., "An Improvement on Secure E-mail Protocols Providing Perfect Forward Secrecy", JCIS, 2006.

Moscaritolo et al., "Silent Circle Instant Messaging Protocol Specification", Silent Circle Engineering, Dec. 5, 2012, Version 1.0.

Ms. Smith, "How to easily encrypt email with Virtru for free: Gmail, Hotmail, Outlook, Yahoo", Network World, Jan. 28, 2014.

Pomian & Corella, LLC, "Submission of Prior Art under 37 CFR 1.501 for U.S. Pat. No. 8,625,805", Apr. 18, 2014.

S. Kent, "Privacy Enhancement for Internet Electronic Mail: Part 2: Certificate-Based Key Managment", Feb. 1993, http://tools.ietf.org/html/rfc1422.

Stedman et al., "A User Study of Off-the-Record Messaging", Symposium on Unstable Privacy and Security (SOUPS), Jul. 2008.

Sui et al., "An Improved Authenticated Key Agreement Protocol with Perfect Forward Secrecy for Wireless Mobile Communication", WCNC, pp. 2088-2093, 2005.

Sun et al., "Password-based authentication and key distribution protocols with perfect forward secrecy", Journal of Computer and System Sciences 72, pp. 1002-1011, 2006.

Toorani et al.,"SSMS—A Secure SMS Messaging Protocol for the M-Payment Systems", Proceedings of the 13th IEEE Symposium on Computers and Communications, IEEE, Jul. 2008.

Wong et al., "Email Protocols with Perfect Forward Secrecy", Int. J. Security and Networks, vol. 7, No. 1, 2012.

Green et al., "Dancing on the Lip of the Volcano—Chosen Ciphertext Attacks on Apple iMessage" Mar. 21, 2016.

Leach et al. "A Universally Unique Identifier (UUID) URN Namespace", Standards Track, Jul. 2005.

Oikonomidis et al. "Identity Based Protocols for Secure Electronic Content Distribution and Licensing Proceedings of the Fourth International Conference on Web Delivering of Music", Wedelmusic 2004.http://ieeexplore.ieee.org/stamp/stamp.jsp?arnumber= 1358105.

Pei et al. "An Intelligent Digital Content Protection Framework between Home Network Receiver Devices", 2006 Interational Conference on Computational Intelligence and Security, http://ieeexplore.IEEE.org/stamp/stamp.jsp?arnumber=4076116.

Yampolskiy, Roman V. "Mimicry Attack on Strategy-Based Behavioral Biometric", Fifth International Conference on Information Technology: New Generations, 2008. ITNG 2008. http://ieeexplore.ieee.org/stamp/stamp.jsp?arnumber=4492601.

Sharma et al., "Prevention of Traffic Analysis Attack in Friend in the Middle using Dummy Traffic Approach", IEEE International Conference on Computational Intelligence and Computing Research, Dec. 2013,http://ieeexplore.ieee.org/stamp/stamp.jsp?arnumber= 6724131.

Yoshida et al., "Controlling File Distribution in the Share Network Through Content Poisoning", IEEE International Conference on Advanced Information Networking and Applications, Apr. 2010,http://ieeexplore.ieee.org/stamp/stamp.sp?arnumber=5474821.

* cited by examiner

SECURE TELECOMMUNICATIONS

CROSS-REFERENCE TO RELATED APPLICATIONS

This application is a continuation of co-pending U.S. patent application Ser. No. 16/142,453, filed on Sep. 26, 2018 and entitled "Secure Telecommunications," which is a continuation of U.S. patent application Ser. No. 15/381,093, filed on Dec. 15, 2016 and entitled "Secure Telecommunications," which issued as U.S. Pat. No. 10,116,637 on Oct. 30, 2018, which is a continuation of U.S. patent application Ser. No. 15/190,139, filed on Jun. 22, 2016 and entitled "Secure Telecommunications," which issued as U.S. Pat. No. 9,596,079 on Mar. 14, 2017, which claims priority to U.S. Provisional Application No. 62/322,679, filed on Apr. 14, 2016 and entitled "Secure Telecommunications," the entireties of which are herein incorporated by reference.

This application is also related to U.S. patent application Ser. No. 15/190,136, filed on Jun. 22, 2016 and entitled "Secure Telecommunications," which issued as U.S. Pat. No. 9,591,479 on Mar. 7, 2017 and U.S. patent application Ser. No. 15/381,095, filed on Dec. 15, 2016 and entitled "Secure Telecommunications," which issued as U.S. Pat. No. 10,135,612 on Mar. 7, 2017 the entireties of which are herein incorporated by reference.

BACKGROUND OF THE INVENTION

As mobile communications continue to increase, breaches of those communications continue to rise as well. In this regard, more sophisticated technology is being developed to intercept and monitor mobile communications. This is problematic for people value privacy to companies that allow their employees to use their personal devices to exchange confidential work-related information. Moreover, companies do not have a tool for conducting encrypted audio and video conferences. Accordingly, there is a need for end-to-end encryption for both audio and video calls, as well as audio and video conferences that are end-to-end encrypted amongst all participants of the conference.

BRIEF DESCRIPTION OF THE DRAWINGS

Various embodiments of the invention are disclosed in the following detailed description and the accompanying drawings.

DETAILED DESCRIPTION

Figure 1:
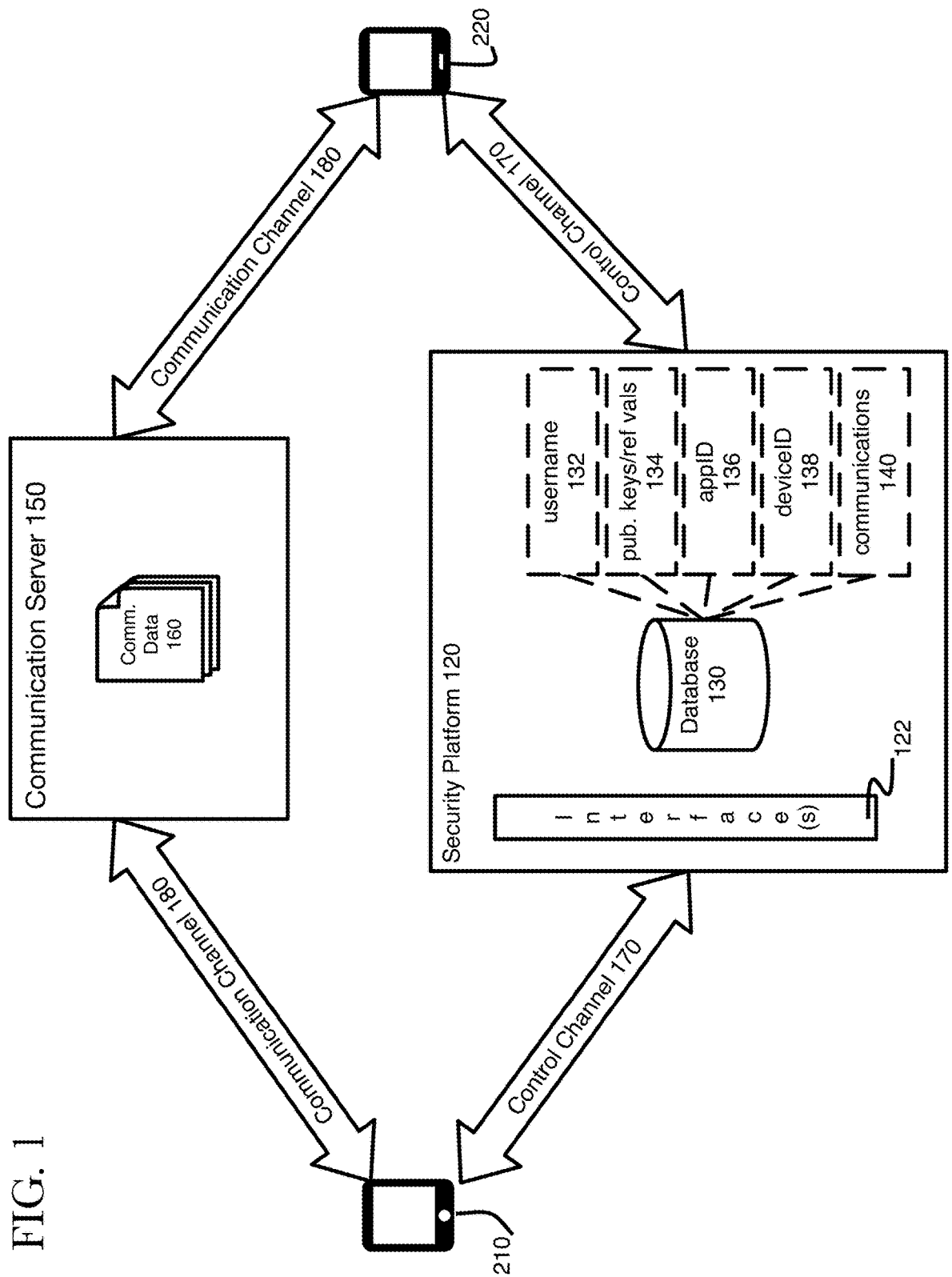
FIG. 1 illustrates a system for providing secure communications according to one embodiment of the disclosure.

The present disclosure describes systems and methods for configuring and participating in encrypted audio calls, audio conferences, video calls, and video conferences (collectively "secure telecommunication(s)"). In particular, the current disclosure describes an initiating client starting a secure telecommunication by generating a meeting identifier and a meeting key. The initiating client then encrypts the meeting identifier and the meeting key (collectively "control information") with an encryption key and distributes the encrypted control information to one or more participants via a control channel. After distributing the control information, the initiating client initiates the secure telecommunication by obtaining communication data, encrypting the communication data using the meeting key, and transmitting the encrypted communication data to the one or more participants via a communication channel.

A participant receives a secure telecommunication request from the initiating client that includes at least the encrypted control information. The participant decrypts the encrypted control information and uses the meeting identifier to obtain the encrypted communication data over a communication channel. The participant decrypts the encrypted communication data with the meeting key received in the secure telecommunication request. Further, the participant responds to the communication data by encrypting reply data with the meeting key received from the initiating client. The participant then transmits the encrypted reply data, along with the meeting identifier, to other participants of the secure telecommunication.

Accordingly, the present disclosure describes techniques for providing end-to-end encryption for both audio and video calls, as well as end-to-end encrypted audio and video conferences.

The present disclosure can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. These implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

FIG. 1 illustrates an embodiment of an environment in which secure communications are exchanged. In particular, FIG. 1 illustrates a first client device 210 and a second client device 220 exchanging data with a security platform 120 via a control channel 170 and a communication server 150 via a communication channel 180.

According to the embodiments described herein, encrypted communications are exchanged using secure communication containers, which encapsulate a sender's communication data and control data. The secure communication container may also include information, such as encryption information, hardware binding information, message security controls, and decryption information—for multiple receivers (as applicable)—to securely travel with the message. The secure communication container also provides cross-platform support so that users may communicate regardless of their operating systems (e.g., Linux, iOS, and Windows), smart phone platforms (e.g., iPhone, Android, Windows, Blackberry, etc.), and device types (e.g., mobile smart phones, tablets, laptops, desktops, etc.). Using the techniques described herein, only intended accounts on intended devices are able to decrypt the communications. Thus, for example, the security platform 120 and the communication server are unable to decrypt communications between the first client device 210 and the second client device 220. As will further be described in more detail below, using the techniques described herein, communicants can maintain a forward secret secure communication channel.

In preferred embodiments, security platform 120 may be implemented on server (not shown), such as a stand-alone server, a corporate server, or a server located in a server farm or cloud-computing environment. Alternatively, the server hosting security platform 120 may be a cloud service provider running a virtual machine configured to provide security platform 120 to an enterprise in the context of Software as a Service (SaaS).

Security platform 120 may be configured to facilitate the exchange of communications for users of a secure collaboration app. As used herein, "communications" and "messages" may take a variety of forms, including: text messages, chat room messages, file sharing, file collaboration, control messages, commands, e-mails, documents, audiovisual files, Short Message Service messages (SMSes), voice calls (i.e., VOIP), video calls, and video conferences. Telecommunications, as used herein, refers to audio calls, voice calls, audiovisual conferences, audio conferences, video calls, videoconferences, and other forms of multimodal communications. Additionally, the content of the messages and/or communications may pertain to electronic transactions, such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. The exchange of messages and/or communications is explained in further detail below.

Security platform 120 may facilitate the exchange of communications and control messages via control channel 170. Control channel 170 may be an encrypted communication channel, such as Transport Layer Security (TLS) or Secure Sockets Layer (SSL), through a public network, such as the the Internet, World Wide Web, local Ethernet networks, private networks using communication protocols proprietary to one or more companies, and cellular and wireless networks (e.g., WiFi). In preferred embodiments, text messages, chat room messages, control messages, commands, e-mails, and Short Message Service messages (SMSes) may be exchanged via the control channel 120. Control messages include commands and instructions sent from either the security platform 120 or a first user's secure collaboration app to a second user's secure collaboration app. Additionally, these control messages may include configuration information to allow the first and second user collaboration apps to configure a secure chat room, initialize an encrypted call, or securely transfer a file.

Like control channel 170, communication channel 180 may be an encrypted communication channel through a public network. Communication channel 180 differs from control channel 170 in that it is primarily used to exchange encrypted files, documents, and telecommunication data. In operation, encrypted data may be transmitted over communication channel 180, while the information necessary to decrypt the encrypted data is transmitted in an encrypted format over the control channel 170. In preferred embodiments, control channel 170 and communication channel 180 are two separate, unique communication channels.

Security platform 120 may provide encrypted communications that easily integrate into and secure existing systems while also providing compliant and secure communications. In this regard, security platform 120 may integrate with existing identity systems and include built-in support for enterprise data retention and support systems.

Security platform 120 may also include database 130. Database 130 may be a relational database that stores information in a variety of tables. In this regard, database 130 may include a record for each user of platform 120 to allow users to find other users and communicate with other users. Accordingly, database 130 may include a table of hashed usernames 132, a table of public keys and reference values 134, a table of appIDs 136, and a table of deviceIDs 138. Each user record may include a hashed username in table 132, a pool of ECDH public components and associated reference values in table 134, app ID(s) in table 136, and deviceID(s) in table 138. Additionally, each user record may store privacy mode and privacy list entries to control with whom the user may communicate. Additionally, database 130 may include a table of communications 140. That is, the security platform may store communications and notifications for users for a predetermined time in table 140. For example, when a message is received, the security platform may store the message in the table of communications and provide an alert, such as a push notification, to the receiver. Accordingly, a receiver may access the security platform to obtain his or her communications stored in table 140. In preferred embodiments, table 140 may store communications for 30 days; however, this may be adjusted, as needed, based on industry standards and/or to comply with industry-mandated regulations. In alternative embodiments, the table of communications 140 may store control messages and/or notifications for shared files or secure telecommunications. Receivers may access these control messages and/or notifications to obtain the information for obtaining the shared files or joining the secure telecommunication.

Security platform 120 may include one or more interface(s) 122 for communicating with client devices 210 and 220 and communication server 150. As one example, platform 120 may provide an application programming interface (API) configured to communicate with apps installed on client devices. Further, platform 120 may also include APIs for interacting with the communication server 150. Additionally, platform 120 may provide other types of interfaces, such as a web interface, or stand alone software programs for desktops and laptops, running on various Operating Systems (OSes). The web interface may allow users of client devices to exchange communications securely (whether with one another or other users), without the need for a separately installed collaboration application. The standalone software program may allow users to exchange secure communications via software that is downloaded by each user. According to some embodiments, platform 120 may make available a master clock time available via the one or more interface(s) 122. The master clock time may be used by the secure collaboration apps to enforce secure time-to-live (TTL) values of communications. The TTL values can be used to enforce (e.g., on behalf of a sender) time constraints on communication access (e.g., by a receiver).

Users of client devices, such as client devices 210, 220, may communicate securely with one another using the techniques described herein. For example, client devices 210, 220, may make use of the security platform 120 and the techniques described herein via a secure collaboration app (not shown). As shown in FIG. 1, client devices may be mobile devices, such as a laptop, smart phone, or tablet, or computing devices, such as desktop computers or servers. As noted above, the secure collaboration app described herein allows cross-platform communications, thereby allowing users of various devices to communicate seamlessly. Further, each user may have different instances of the collaboration app across multiple devices. That is, the user of device 210 may be able to receive communications on both device 210, as well as on any other devices that the user may have that includes a copy of the secure collaboration app, such as a laptop. In some embodiments, client devices 210, 220 may be the users' personal devices (i.e. a bring your own device (BYOD) scenario). Alternatively, client devices may include other types of devices, such as game consoles, camera/video recorders, video players (e.g., incorporating DVD, Blu-ray, Red Laser, Optical, and/or streaming technologies), smart TVs, and other network-connected appliances, as applicable. According to one embodiment, client devices 210, 220 may be landline phones and the security platform and communication server may be installed on a Private Branch Exchange (PBX) or other corporate phone network.

In addition to communicating with security platform 120, client devices 210, 220 may also access the communication server 150 to share encrypted files or to participate in an secure telecommunications with other devices. In this regard, users may upload communication data 160, such as files, documents, spreadsheets, images, animated gifs, streaming audio data, streaming video data, etc., to the communication server 150 using the secure collaboration apps located on their client devices. According to preferred embodiments, the secure collaboration app allows clients to encrypt the communication data before uploading it to the communication server. In some embodiments, the communication server 150 and the security platform 120 are co-located. In alternative embodiments, the communication server 150 and the security platform 120 may be physically separated on two different servers.

Figure 2:
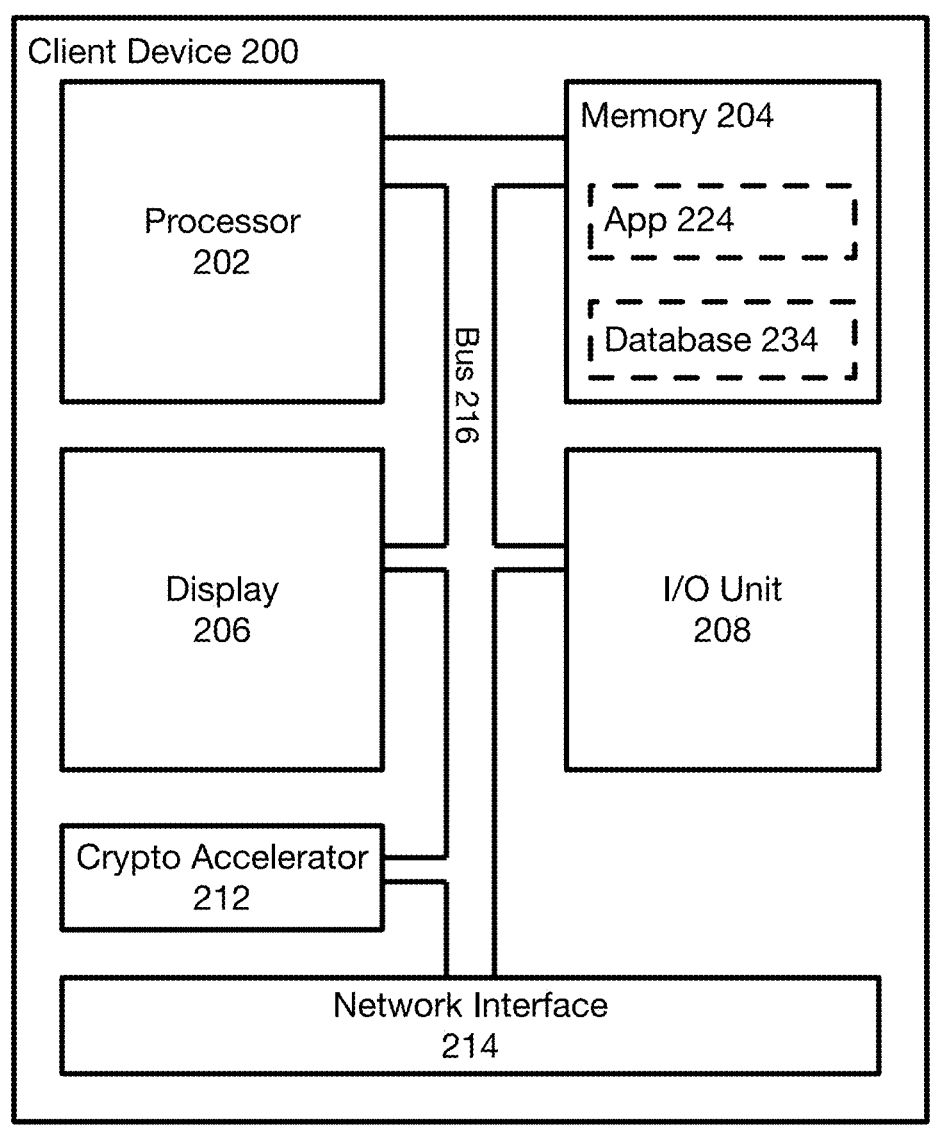
FIG. 2 illustrates a client device that transmits and receives encrypted communications using a secure collaboration app.

FIG. 2 illustrates an exemplary client device 200 that may access the security platform 120 via a secure collaboration app. In this regard, client device 200 includes a processor 202, a memory 204, a display 206, an I/O unit 208, a cryptographic ("crypto") accelerator 212, and a network interface 214 all interconnected by bus 216. Processor 202 may be any processor capable of interacting with the components of client device 200. For example, processor 202 may include a processor, multiprocessors, multicore processor, a dedicated controller, such as an ARM processor, an ASIC, or an FPGA, or any combination thereof. Memory 204 may store information accessible by processor 202, including instructions and data that may be executed or otherwise used by the processor 202 and/or crypto accelerator 212. For example, memory 204 may store instructions, such as app 224. In preferred embodiments, app 224 may be a secure collaboration app that provides users with the ability to participate in secure telecommunications, share encrypted content, and exchange encrypted communications. Encrypted communications may include direct communications (e.g., one-to-one communications between a sender and receiver), group chats, or secure chat room communications. Data stored by memory 204 may also include database 234. Database 234 may be encrypted via an encryption algorithm, such as Advanced Encryption Standard (AES), and a 256-bit key, referred to hereinafter as a local storage key. In some embodiments, database 234 may be used to store information related to secure collaboration app 224. For example, database 234 may index information related to the secure collaboration app, such as key information, user information, friend information, and communications. In this regard, communications transmitted and received by the secure collaboration app, including a message identifier, a hash of the sender's username, a hash of the sender's appID, a hash of the receiver's username, a hash of the receiver's appID, the message encryption key, and a timestamp of each communication may be stored in database 234. Accordingly, memory 204 may be any type of media capable of storing the information above, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 204 may include short term or temporary storage as well as long term or persistent storage.

Display 206 may be any electronic device capable of rendering information visually. In mobile devices, such as smart phones and tablets, display 206 may be a touchscreen. In this regard, display 206 may be integrated with I/O unit 208 to detect user inputs, in addition to outputting data information to the user. In computing devices, display 206 may be an output, such as a VGA, DVI, or HDMI output, configured to connect to a monitor. I/O unit 208 may be capable of receiving input from a user. As noted above, the I/O unit 208 may work with touchscreen displays to receive input from a user. Alternatively, the I/O unit may be an interface capable of interacting with input and output devices, such as keyboards, mice, monitors, printers, etc. Additionally, the I/O unit 208 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Furthermore, the I/O unit 208 may control a microphone, speaker, and/or camera that may be used for secure telecommunications.

Crypto accelerator 212 may be dedicated hardware, software, or any combination thereof that is capable of performing cryptographic operations, such as key generation, random number generation, encryption/decryption, signature generation, signature verification, etc. In preferred embodiments, crypto accelerator 212 is a dedicated processor configured to perform cryptographic operations on behalf of processor 202. In this regard, app 224 may make use of crypto accelerator 212 to provide the secure communication functions described in greater detail below.

Network interface 214 may be dedicated hardware, software, or any combination thereof that is capable of connecting client device 200 to network 112. In this regard, network interface 214 may include various configurations and use various communication protocols including Ethernet, TCP/IP, ATM, cellular and wireless communication protocols (e.g. 802.11, LTE), instant messaging, HTTP and SMTP, and various combinations of the foregoing.

Figure 3:
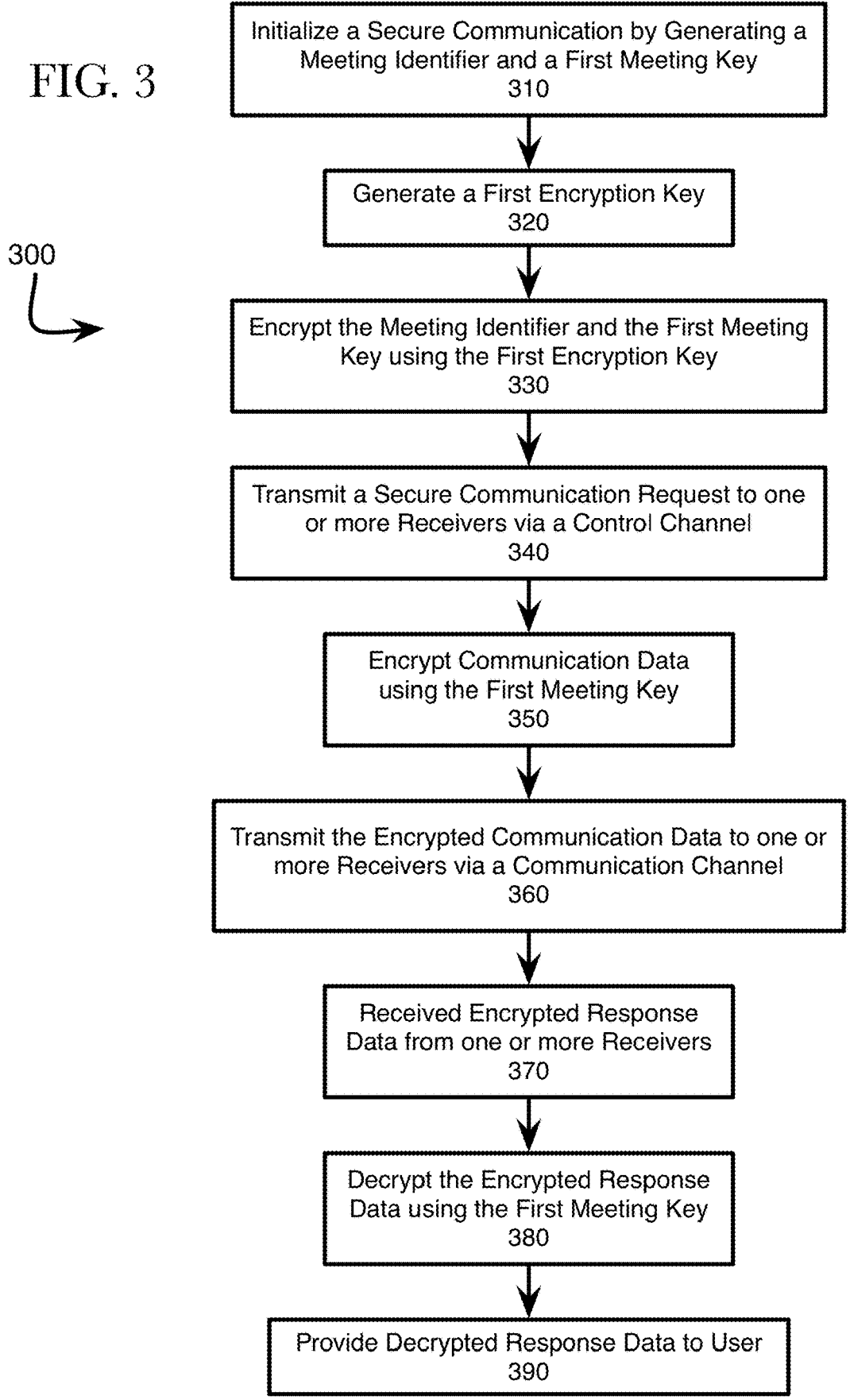
FIG. 3 illustrates a process for an initiating client to configure a secure telecommunication and transmit encrypted communication data during the secure telecommunication.

As noted above, secure telecommunications, such as encrypted audio calls, encrypted audio conferences, encrypted video calls, and encrypted video conferences, may be exchanged between users of a secure collaboration app. FIG. 3 illustrates a process 300 for an initiating client to configure a secure telecommunication and transmit encrypted communication data during the secure telecommunication. The process 300 begins in block 310 with a secure collaboration app initializing a secure telecommunication by generating a meeting identifier and a first meeting key. The secure collaboration app may initialize the secure telecommunication in response to receiving an input from a user. For example, a user in a one-to-one communication or a group chat may select an icon, such as a telephone icon or a video camera icon, to initiate the secure telecommunication. To configure the secure telecommunication, the initiating client's secure collaboration app generates a meeting identifier by hashing at least one property associated with the secure telecommunication. The at least one property may include the number of participants in the call, the date and time the call started, or information identifying the initiating client (e.g., username, deviceID, appID, etc.). Additionally, the secure collaboration app generates a first meeting key. The first meeting key is a 256-bit key generated by applying multiple rounds of a hash function (e.g. SHA256, SHA384, SHA521) to a first set of pseudorandom bytes derived from the initiating client's device. The first set of pseudorandom bytes may be derived from ephemeral environmental noise obtained from device drivers and other kernel operations. For example, data from various sensors (e.g., the at least one accelerometer, Global Positioning Satellite (GPS) system, magnetometer, proximity sensor, ambient light sensor, moisture sensor, and gyroscope) may be used as the first set of pseudorandom bytes.

In block 320, the initiating client's secure collaboration app generates a first encryption key. In preferred embodiments, the first encryption key is a 256-bit key derived from a second set of pseudorandom bytes derived from the initiating client's device Like the first meeting key, the first encryption key is generated by applying multiple rounds of a hash function to the second set of pseudorandom bytes. After generating the first encryption key, the initiating client's secure collaboration app encrypts the meeting identifier and the first meeting key with the first encryption key in block 330. In preferred embodiments, the crypto processor on the initiating client's device encrypts the meeting identifier and first meeting key using a symmetric encryption algorithm, such as Advanced Encryption Standard (AES), Data Encryption Standard (DES), or Triple DES (3DES).

Once the meeting identifier and first meeting key are encrypted, the initiating client's secure collaboration app generates a secure telecommunication request and transmits it to one or more receivers, via a control channel, in block 340. The encapsulation and transmission of the secure telecommunication request is discussed in greater detail below with respect to FIG. 4. In block 350, the initiating client's secure collaboration device encrypts communication data via a symmetric encryption algorithm and the first meeting key. The communication data may be audio data captured from a microphone, video data captured using a camera, or any combination thereof. In block 360, the encrypted communication data is transmitted to one or more receivers via a communication channel.

In block 370, the initiating client's secure collaboration app receives encrypted response data from one or more receivers. The encrypted response data is decrypted using the first meeting key in block 380. Finally, in block 390, the initiating client's secure collaboration app provides the decrypted response data to the secure telecommunication initiator for his or her review. Similar to the communication data transmitted by the initiating client, the response data may include audio data, video data, or any combination thereof. According to some embodiments, the response data does not need to be in the same format as the communication data provided by the secure telecommunication initiator. For example, one or more receivers may respond with only audio data in response to receiving audio and video data from the initiator. Alternatively, the initiator may only transmit audio data to one or more receivers, but receive both audio and video data in response.

Figure 4:
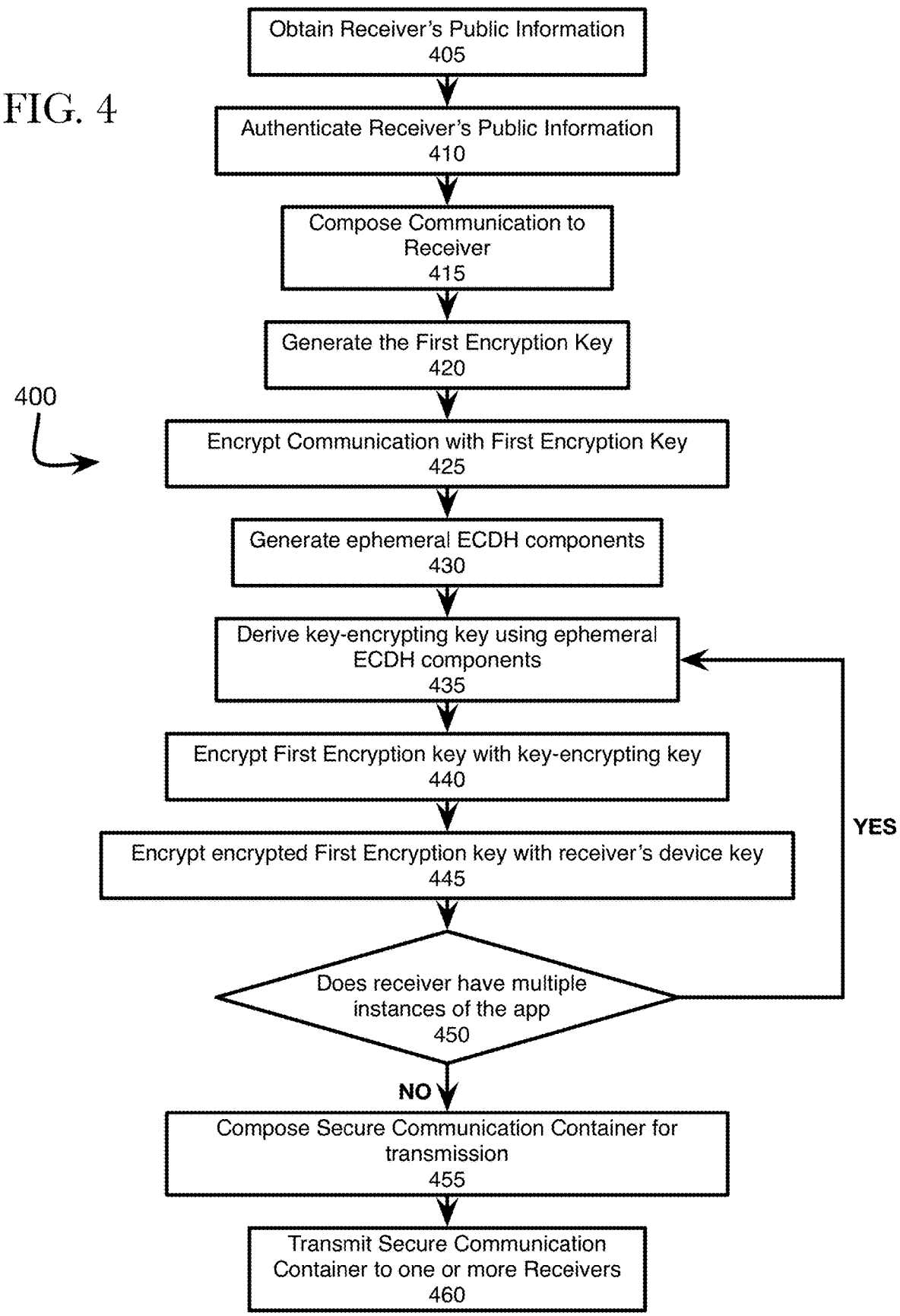
FIG. 4 illustrates a process for an initiating client to transmit encrypted control information related to a secure telecommunication to one or more receivers.

Turning to FIG. 4, a detailed process 400 for transmitting encrypted communications, including encrypted messages and the secure telecommunication request, to one or more receivers is illustrated. The method begins in block 405, with the initiating client's secure collaboration app obtaining the one or more receivers' public information from the security platform. In this regard, each receiver's public information may include at least one of the receiver's app ID, user-level signing public key, signed app-level signing public key, a signed ephemeral ECDH public component, an identifier of the ephemeral ECDH public component, and the receiver's device key. In preferred embodiments, the security platform randomly selects one of the signed ephemeral ECDH public components from a pool of public components that the receiver has previously uploaded. In order to prevent the selected public component from being used for a subsequent communication, the security platform will delete the selected ephemeral ECDH public component after providing it to the initiating client's device. If a receiver has multiple instantiations of the secure collaboration app installed on different devices, the initiating client's secure collaboration app will receive a unique signed app-level signing public key, signed ephemeral ECDH public component, identifier of the ephemeral ECDH public component, and device key for each instance of app in block 405. The multiple instance information may be provided in an arrayed response by the security platform.

In block 410, the initiating client's secure collaboration app authenticates the public information received from the security platform. In particular, the user-level signing public key received from security platform is used to verify a signature attached to the app-level signing public key. If the receiver has multiple instances of the app, the initiating client's secure collaboration app will authenticate the app-level public key for each of the receiver's instantiation of the secure collaboration apps. When the signature attached to the app-level public key is successfully validated, the initiating client's secure collaboration app uses the received app-level signing public key to validate the signatures appended to the received ephemeral ECDH public component.

After authenticating the one or more receivers' public information, the initiating client composes his or her communication to the one or more receivers in block 415. As noted above, the communication may be a text message, chat room message, control message, command, e-mail, Short Message Service message (SMSes), Multimedia Message Service message (MMSes). Continuing the example described above with respect to FIG. 3, the secure communication request is a control message that notifies the one or more receivers' secure collaboration apps that the initiating client wants to begin a secure telecommunication. Accordingly, the payload of the secure telecommunication request will include an indication of the type of meeting (e.g., audio, video, or both) and encrypted control information (e.g., meeting identifier, the encrypted first meeting key). In block 420, the initiating client's secure collaboration app generates the first encryption key by applying multiple rounds of a hash function to a second set of pseudorandom bytes. In block 425, the initiating client's secure collaboration app encrypts the communication according to a symmetric encryption algorithm. Continuing the example above, the initiating client's secure collaboration app encrypts the meeting type, meeting identifier, and the first meeting key, via AES, using the first encryption key.

In block 430, the initiating client's secure collaboration app generates a pair of ephemeral ECDH components. The pair of ephemeral ECDH components is generated using ECC with a P-521 curve. In block 435, the initiator's secure collaboration app derives a key-encrypting key using the receiver's ephemeral ECDH public component and the ephemeral ECDH private component generated by the initiator's secure collaboration app. In preferred embodiments, the key-encrypting key is a 256-bit key derived using ephemeral ECDH.

In block 440, the first encryption key is encrypted using the key-encrypting key. In preferred embodiments, the first encryption key is encrypted by the crypto accelerator using AES and the key-encrypting key. In block 445, the initiating client's secure collaboration app encrypts the first encryption key again using the receiver's device key obtained from the security platform with the receiver's public information. Encrypting the first encryption key with an ephemeral component generated by the receiver's app and the device key provides a twice-encrypted first encryption key that effectively binds the message to the receiver's secure collaboration app and device.

In block 450, the initiating client's secure collaboration app determines whether the receiver has multiple instantiations of the secure collaboration app installed on a plurality of devices. If so, the initiator's secure collaboration app repeats blocks 435, 440, and 445 for each instance of the receiver's app. In this regard, each instance will receive a twice-encrypted first encryption key that is unique to that instantiation of the secure collaboration app. Accordingly, each instance will only be able to decrypt the twice-encrypted first encryption key that has been encrypted with the unique device key and ephemeral public component associated with that device.

When twice-encrypted first encryption keys have been generated for each of the receiver's instantiations of the secure collaboration app, the initiating client's secure collaboration app composes a secure communication container in block 455. The secure communication container includes a payload and a header. The payload comprises the encrypted communication; while the header includes destination entries for each of one or more receivers' instantiations of the secure collaboration app. Each destination entry includes at least one of a twice-encrypted first encryption key; an identifier for the ephemeral ECDH component used to generate the key-encrypting key; and the initiating client's public ECDH component for the key-encrypting key. Following the example above, the payload of the secure communication container will contain at least the encrypted control information (e.g., meeting identifier, first meeting key, type of secure telecommunication).

Once the secure communication container is assembled, the initiating client's secure collaboration app will transmit the secure communication container to the one or more receivers in block 460. In preferred embodiments, the initiator's secure collaboration app transmits the secure communication container to the one or more receivers via a secure control channel. In preferred embodiments, the secure communication container will be transmitted to the security platform, which will notify each of the one or more receivers that they have a new communication waiting for them.

Figure 5:
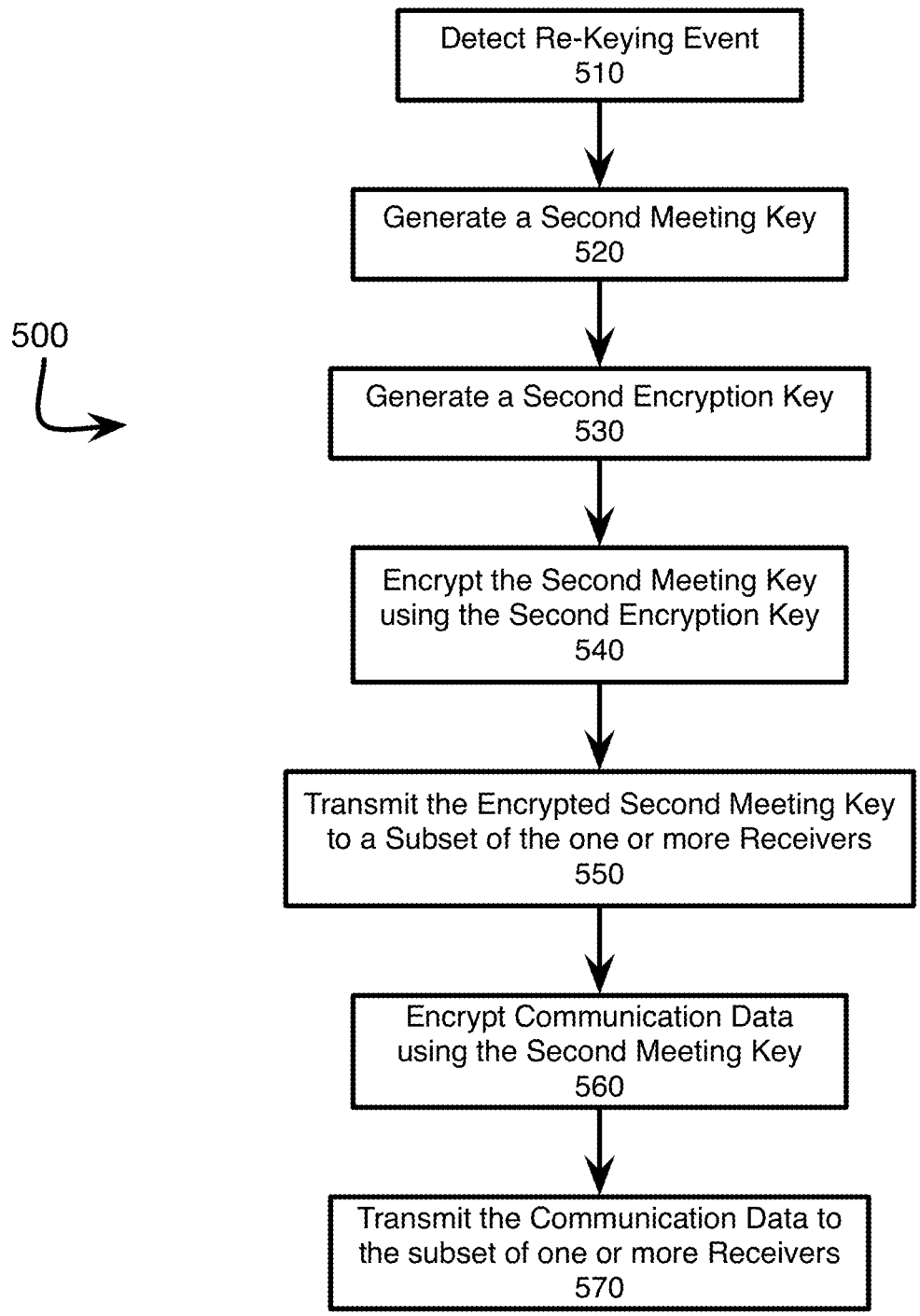
FIG. 5 illustrates an exemplary process for an initiating client to rekey a secure telecommunication.

Periodically, the initiating client may need to rekey the secure communication. FIG. 5 shows an exemplary process 500 for rekeying a secure telecommunication. In block 510, a rekeying event is detected. Rekeying events may include one or more receivers rejecting the secure telecommunication request. Alternatively, a rekeying event may include one or more receivers leaving a conference call, either on their own volition or by the initiator removing them. In response to detecting a re-keying event, the initiating client's secure collaboration app generates a second meeting key in block 520. As noted above, the second meeting key is derived by applying multiple rounds of a hash function to a third set of pseudorandom bytes derived from the initiator's device. In block 530, the initiating client's secure collaboration app generates a second encryption key. The second encryption key is produced by passing a fourth set of pseudorandom bytes through multiple rounds of a hash function. In block 540, the initiating client's secure collaboration app encrypts the second meeting key, via a symmetric encryption algorithm, using the second encryption key. In block 550, the encrypted second meeting key is transmitted to a subset of the one or more receivers. In preferred embodiments, the encrypted second meeting key is distributed to the subset of one or more receivers using the techniques described above with respect to FIG. 4. After the second meeting key is transmitted to the subset of one or more receivers, the initiating client encrypts communication data using the second meeting key in block 560. In block 570, the communication data encrypted with the second meeting key is transmitted to the subset of one or more receivers.

Figure 6:
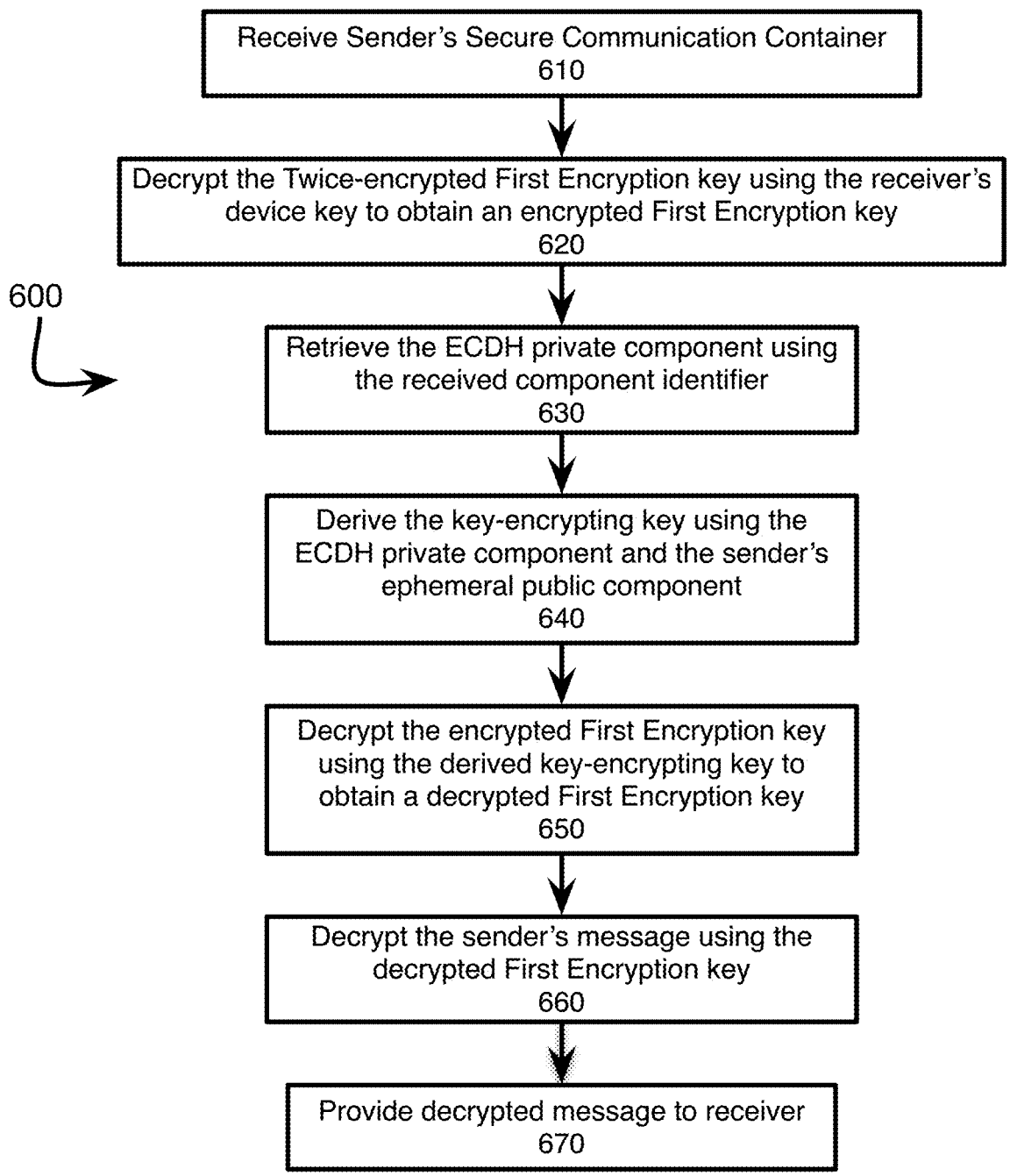
FIG. 6 illustrates a process for receiving and decrypting an encrypted communication received from an initiating client.

Prior to joining a secure telecommunication, the one or more receiving client devices must receive notification that an initiating client is beginning a secure telecommunication. FIG. 6 illustrates an exemplary process 600 for receiving notification that an initiating client is beginning a secure telecommunication. In block 610, the one or more receiving client devices receive a secure communication container. As noted above, the secure communication container may contain a communication or a control message. In examples where the secure communication container includes a communication, the receiving client device may receive an alert, such as a push notification, which prompts the receiving client device's secure collaboration app to connect to the security platform and retrieve the initiating client's secure communication container. In examples where the secure communication container includes a control message, the secure communication container may be pushed directly to the receiving client's device, which prompts the receiving client device's secure collaboration app to decrypt the received control message using the steps described below and execute the command or instruction contained in the payload of the secure communication container.

As previously discussed, the header of the secure communication container includes a destination entry that includes at least a twice-encrypted first encryption key. Accordingly, in block 620, the receiving client device's secure collaboration app decrypts the twice-encrypted first encryption key using the device key associated with the receiving client device. Next, in block 630, the receiving client's secure collaboration app uses the ECDH component identifier received in the secure communication container to retrieve the ephemeral ECDH private component that corresponds to the public component the initiating device used to generate the key-encrypting key. In block 640, the receiving client's secure collaboration app derives the key-encrypting key using the retrieved ephemeral private component and initiator's ephemeral public component that was transmitted in the secure communication container. After deriving the key-encrypting key, the receiving client device's secure collaboration app decrypts the encrypted first encryption key in block 650 to obtain the first encryption key. In block 660, the first encryption key is used to decrypt the payload of the secure communication container. In preferred embodiments, the payload is decrypted via a symmetric encryption/decryption scheme, such as AES, DES, or 3DES. In examples where the payload contains a communication—such as a message, the decrypted communication may be provided to the receiver in block 670. In examples where the payload contains a control message, the receiving client's secure collaboration app may execute the command or instruction contained in the control message. In this regard, the secure collaboration app may display an indication of the executed command. For example, if the control message contains information about beginning a secure telecommunication, a dialog may be displayed providing the the user with the option to join or reject the secure telecommunication.

Figure 7:
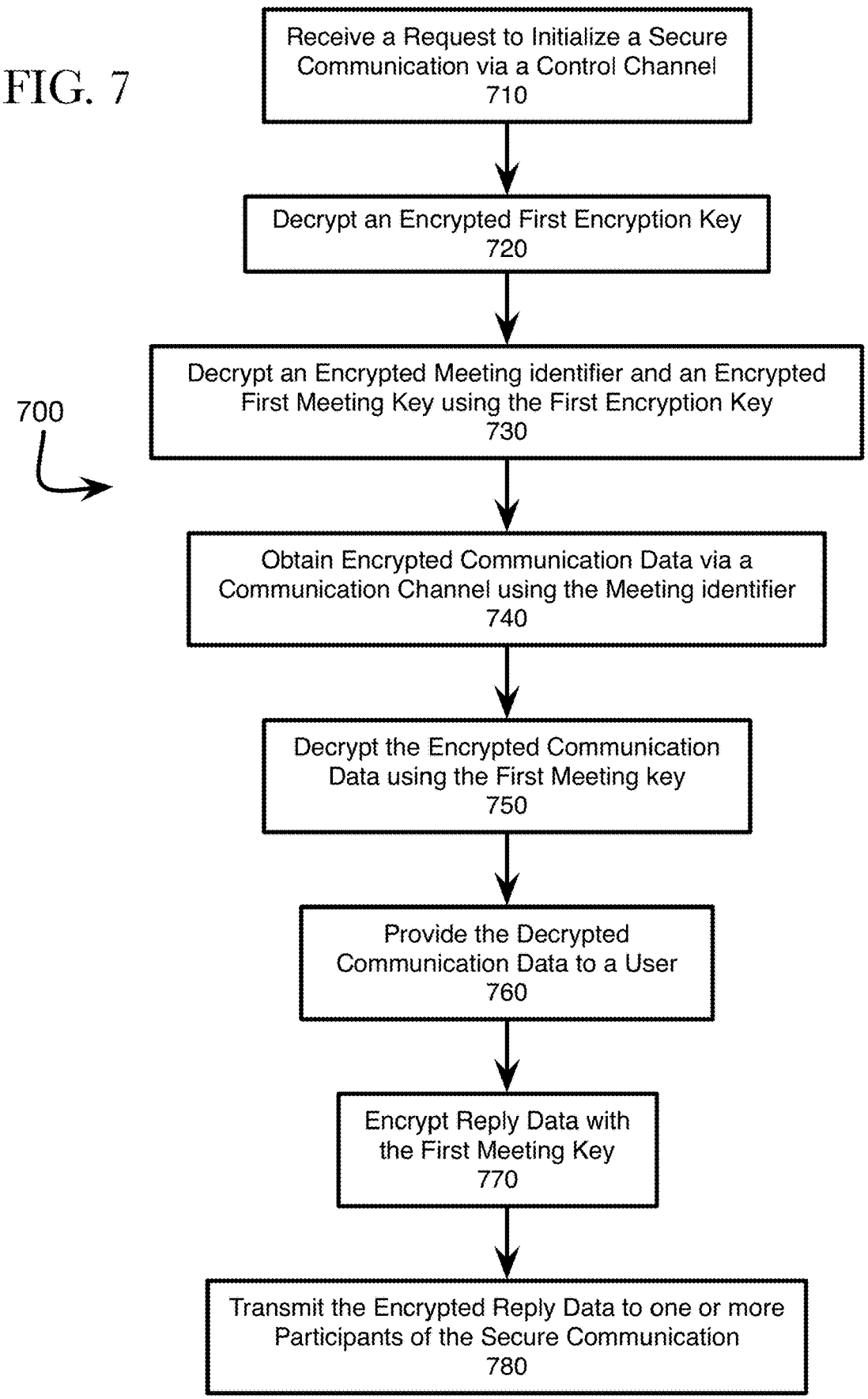
FIG. 7 illustrates a process for receiving secure telecommunication requests and participating in secure calls.

Turning to FIG. 7, a process 700 for receiving secure telecommunication requests and participating in secure telecommunications is shown. In block 710, one or more participants receive a secure telecommunication request via a secure control channel. As noted above, the secure telecommunication request is a request to initialize a secure telecommunication between the initiating client and the one or more receivers. As noted above, the secure telecommunication request includes encrypted control information (e.g., meeting identifier, first meeting key, type of secure telecommunication). In block 720, the one or more receivers decrypt an encrypted first encryption key using the techniques described above. The decrypted first encryption key is then used to decrypt the encrypted control information in block 730. The one or more participants obtain encrypted communication data using the decrypted meeting identifier in block 740. In preferred embodiments, the one or more participants transmit the decrypted meeting identifier to a communication server via a secure channel. The communication server searches for the encrypted communication data that corresponds to the received meeting identifier and transmits the encrypted communication data to the one or more participants. The one or more participants receive the encrypted communication data from the communication server and decrypt the encrypted communication data using the decrypted first meeting key in block 750. In block 760, the decrypted communication data is provided to a user. As noted above, the decrypted communication data may include audio data, video data, or a combination thereof. Accordingly, the one or more participants' devices may play the decrypted audio data and/or display the decrypted video data.

The one or more participants may reply to the received communication. In this regard, reply data may be captured by the one or more participants' microphones or cameras. In block 770, the one or more participants' secure collaboration app encrypts the reply data with the first meeting key. After encrypting the reply data, it is transmitted to the one or more participants of the secure telecommunication in block 780 using the techniques described above.

Figure 8A:
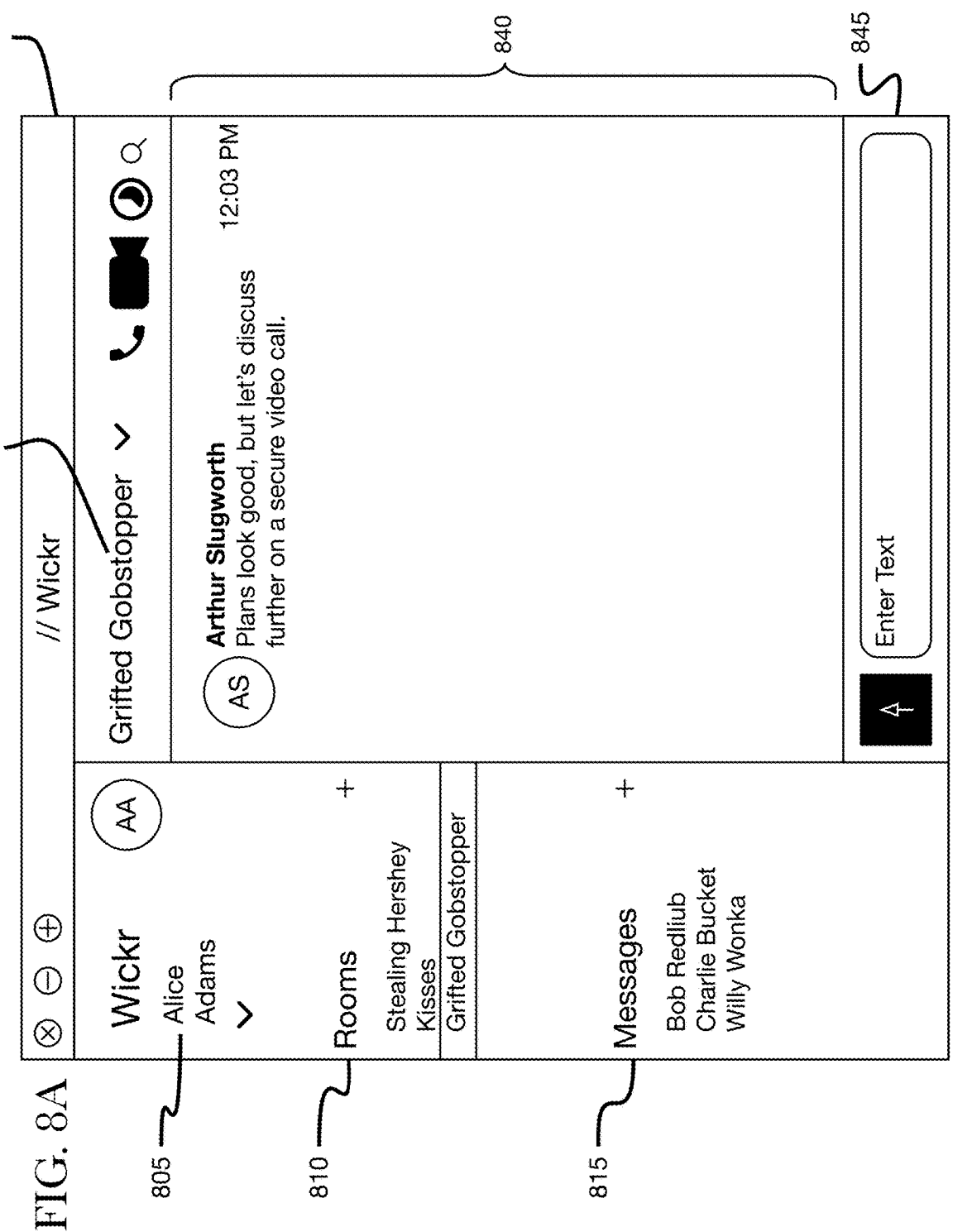
FIGS. 8A and 8B illustrate an example of a desktop interface for conducting a secure telecommunication.
Figure 8B:
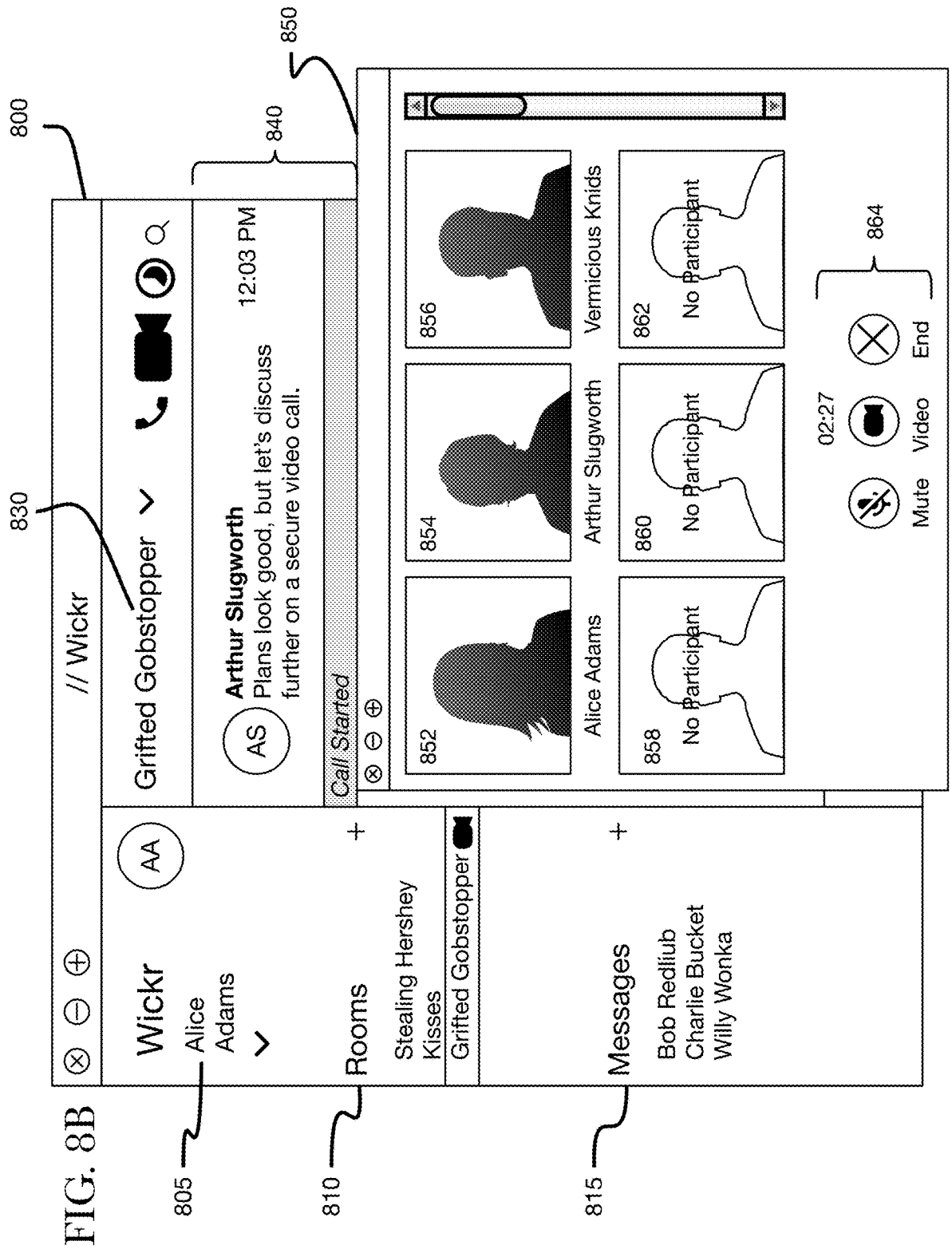

Turning to FIGS. 8A and 8B, an example of a desktop interface 800 for exchanging cryptographic communications and initiating secure telecommunications is shown. The interface 800 includes user information field 805, which displays user information including the user's name, their username, and an avatar that is displayed to other users. As shown in FIGS. 8A and 8B, the interface 800 belongs to Alice Adams. Additionally, the interface 800 may include a room identification field 810 and a message identifier field 820. The room identification field 810 and a message identifier field 815 may indicate the secure chat rooms the user is participating in and the open one-to-one communications the user has open, respectively.

FIGS. 8A and 8B illustrate that Alice Adams is participating in a secure chat room. This is reflected by the highlighted field (e.g. "Grifted Gobstopper") under the room identification field 810. Additionally, a header 830 shows general information about the communication that the user is participating in. For example, the header 830 may include the name of the secure chat room and a plurality of icons, such as a phone icon capable of initiating a secure audio conference; a video camera icon capable of initiating a secure video conference; a clock icon configured to set a TTL for communications exchanged in the secure chat room; and a magnifying glass icon capable of searching the text of the secure chat room. In one-to-one communications, the header field differs from the secure chat room in that the name of the other communicant may be displayed instead of the name of the secure chat room. Below the header field, a conversation field 840 is shown. The conversation field 840 may include the communications, including messages, shared images, shared files, videos, voice recordings, etc., exchanged between users. Below the conversation field is a user input field 845. The user input field 845 allows a user to enter text and send it to other communicants. Further, the user input field 845 may include an upload button, which allows clients to share content in a secure manner. In particular, clients may select the upload button which may prompt the client to select a file from their device. Alternatively, selecting the upload button may prompt the client to take a picture, which will then be uploaded and displayed in the conversation field 840. In this regard, any selected files will be encrypted before being shared with other communicants, as discussed in greater detail below.

FIG. 8B illustrates an example of a secure video conference initiated by one of the members of the secure chat room. In this regard, one of the secure chat room participants selected the video camera icon in the header field 830, prompting a video conferencing window 850 to pop-up. Further, the conversation field 840 displays an indication that a call has started. The video conferencing window 850 comprising a plurality of tiles for each participant in the secure video conference. Each tile displays information about respective participants. For example, FIG. 8B shows a first tile 852 displaying information for Alice Adams, a second tile 854 displaying information for Arthur Slugworth, a third tile 856 displaying information for Vermicious Knids, and a fourth tile 858, a fifth tile 860, and a sixth tile 862 each displaying no participant. In preferred embodiments, the user's own information is displayed in the upper leftmost tile. Accordingly, Alice Adams is displayed in the first tile 852. While six tiles are shown, the participant tiles may be configured according to the number of participants on the call. For example, three tiles may be shown instead of the six shown in FIG. 8B. Alternatively, when there are more than six participants in the video conference, a scroll bar in the video conferencing window 850 may be used to scroll amongst all participants of the video conference. Furthermore, video conferencing window 850 includes call control information 864. This call control information may include a timer indicating the duration of the call, a mute button to mute the user's microphone, a video button to turn the user's camera on and off, and an end button to end the video conference. For example, if the user, Alice Adams, selects the mute button, an icon may be displayed in the first tile 852 indicating that she has muted her microphone. In another example, Alice Adams may turn off her camera by selecting the video camera icon in the call control information 864. When the camera is turned off, an avatar of the user may be displayed in the tile in lieu of the video.

Figure 9:
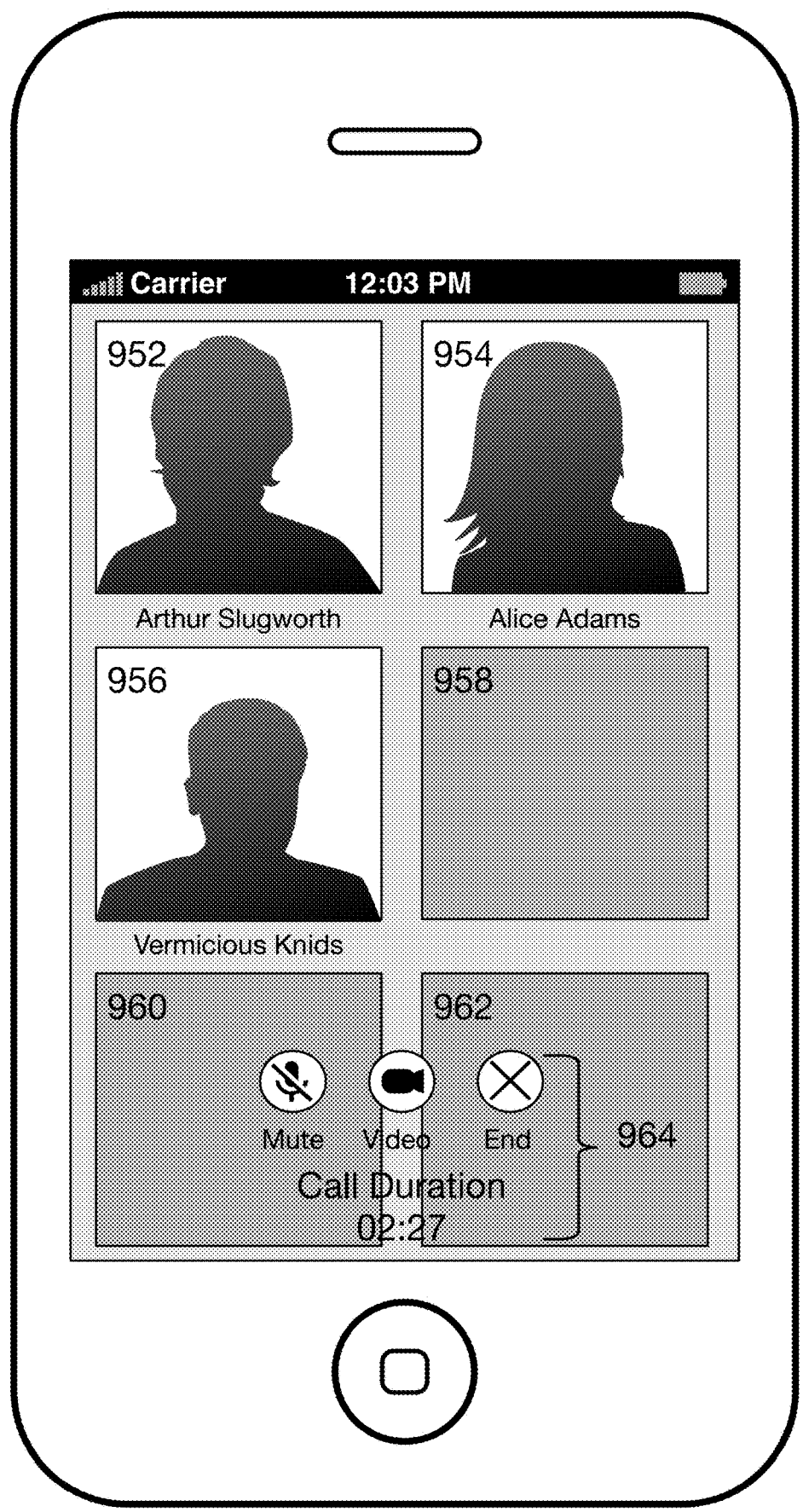
FIG. 9 illustrates an example of a secure telecommunication interface on a mobile device.

FIG. 9 illustrates an example of a secure video conference interface on a mobile device Like the desktop interface discussed above in FIGS. 8A and 8B, the mobile secure video conference interface includes a first tile 952, a second tile 954, a third tile 956, a fourth tile 958, a fifth tile 960, a sixth tile 962, and call control information 964. As noted above, user information is shown in the upper leftmost tile. In this regard, FIG. 9 shows that the mobile device belongs to Arthur Slugworth, as his data is displayed in the first tile 952. Other participant information is shown in additional tiles. For example, Alice Adams's data is shown in the second tile 954 and Vermicious Knids's data is displayed in the third tile 956. As with the desktop interface discussed above, the participant tiles may be configured according to the number of participants on the call. For example, three tiles may be shown instead of the six shown in FIG. 9. Alternatively, when more than six participants are on the encrypted video conference, a scroll bar may be used to scroll through all participants of the video conference.

Although the foregoing embodiments have been described in some detail for purposes of clarity of understanding, the present disclosure is not limited to the details provided. There are many alternative ways of implementing the present disclosure. The disclosed embodiments are illustrative and not restrictive.

What is claimed is:

1. A method comprising:
   generating an asymmetric key pair, wherein the asymmetric key pair comprises a first ephemeral public component and a first ephemeral private component;
   deriving a key-encrypting key using the first ephemeral private component and a second ephemeral public component, wherein the second ephemeral public component is associated with at least one second device;
   encrypting a first key using the derived key-encrypting key;
   sending, from a first device to the at least one second device, a request to initialize a secure communication session via a control channel, wherein the request includes a first identifier, the encrypted first key, and the first ephemeral public component;
   encrypting, by the first device and using the first key, communication data; and
   sending, by the first device to the at least one second device and via a communication channel, the encrypted communication data and the first identifier.

2. The method of claim 1, further comprising:
   retrieving the second ephemeral public component from a server.

3. The method of claim 1, wherein the encrypted communication data and the first identifier are sent to the at least one second device via a communication server.

4. The method of claim 1, wherein the secure communication session comprises at least one of a video call, an audio call, a video conference, or a conference call.

5. The method of claim 1, further comprising:
   receiving, by the first device from the at least one second device, second encrypted communication data;
   decrypting, using the first key, the second encrypted communication data; and
   providing the second decrypted communication data to a user of the first device.

6. The method of claim 5, wherein the second encrypted communication data is received via a communication server.

7. A first device comprising:
   one or more processors; and
   memory comprising instructions that, when executed by the one or more processors, cause the first device to:
   generate an asymmetric key pair, wherein the asymmetric key pair comprises a first ephemeral public component and a first ephemeral private component;
   derive a key-encrypting key using the first ephemeral private component and a second ephemeral public component, wherein the second ephemeral public component is associated with at least one second device;
   encrypt a first key using the derived key-encrypting key;
   send, to the at least one second device, a request to initialize a secure communication session via a control channel, wherein the request includes a first identifier, the encrypted first key, and the first ephemeral public component;
   encrypt, using the first key, communication data; and
   send, to the at least one second device and via a communication channel, the encrypted communication data and the first identifier.

8. The first device of claim 7, wherein the instructions, when executed by the one or more processors, cause the first device to:
   retrieve the second ephemeral public component from a server.

9. The first device of claim 7, wherein the encrypted communication data and the first identifier are sent to the at least one second device via a communication server.

10. The first device of claim 7, wherein the secure communication session comprises at least one of a video call, an audio call, a video conference, or a conference call.

11. The first device of claim 7, wherein the instructions, when executed by the one or more processors, cause the first device to:

receive, from the at least one second device, second encrypted communication data;

decrypt, using the first key, the second encrypted communication data; and provide the second decrypted communication data to a user of the first device.

12. The first device of claim 11, wherein the second encrypted communication data is received via a communication server.

13. One or more non-transitory media storing instructions that, when executed by one or more processors, cause the one or more processors to perform steps comprising:

generating an asymmetric key pair, wherein the asymmetric key pair comprises a first ephemeral public component and a first ephemeral private component;

deriving a key-encrypting key using the first ephemeral private component and a second ephemeral public component, wherein the second ephemeral public component is associated with at least one second device;

encrypting a first key using the derived key-encrypting key;

sending, from a first device to the at least one second device, a request to initialize a secure communication session via a control channel, wherein the request includes a first identifier, the encrypted first key, and the first ephemeral public component;

encrypting, by the first device and using the first key, communication data; and sending, by the first device to the at least one second device and via a communication channel, the encrypted communication data and the first identifier.

14. The one or more non-transitory media of claim 13, wherein the instructions cause the one or more processors to perform steps comprising:

retrieving the second ephemeral public component from a server.

15. The one or more non-transitory media of claim 13, wherein the encrypted communication data and the first identifier are sent to the at least one second device via a communication server.

16. The one or more non-transitory media of claim 13, wherein the secure communication session comprises at least one of a video call, an audio call, a video conference, or a conference call.

17. The one or more non-transitory media of claim 13, wherein the instructions cause the one or more processors to perform steps comprising:

receiving, by the first device from the at least one second device, second encrypted communication data, wherein the second encrypted communication data is received via a communication server;

decrypting, using the first key, the second encrypted communication data; and providing the second decrypted communication data to a user of the first device.

\* \* \* \* \*